(12) United States Patent
Butterworth et al.

(10) Patent No.: US 6,498,632 B1
(45) Date of Patent: Dec. 24, 2002

(54) COLOR REFLECTIVE FERROELECTRIC LIQUID CRYSTAL LIGHT VALVE WITH THREE SPATIAL LIGHT MODULATORS AND INCREASED LIGHT THROUGHPUT

(75) Inventors: Mark M. Butterworth, Santa Clara, CA (US); Rene P. Helbing, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/300,347

(22) Filed: Apr. 27, 1999

(51) Int. Cl.⁷ .......................... G02F 1/1335; G02F 1/13
(52) U.S. Cl. .............................. 349/77; 353/34; 349/8; 349/172
(58) Field of Search ............................. 349/5, 8, 172, 349/117, 74, 75, 77; 359/634; 353/31, 33, 34

(56) References Cited

U.S. PATENT DOCUMENTS

| | | | |
|---|---|---|---|
| 5,126,864 A | | 6/1992 | Akiyama et al. ............. 359/53 |
| 5,495,351 A | * | 2/1996 | Shingaki et al. ............ 349/171 |
| 5,583,674 A | * | 12/1996 | Mosley ....................... 349/100 |
| 5,644,432 A | * | 7/1997 | Doany ......................... 359/634 |
| 5,658,490 A | | 8/1997 | Sharp et al. ............ 252/299.01 |
| 6,046,858 A | * | 4/2000 | Scott et al. .................. 359/634 |
| 6,100,945 A | * | 8/2000 | Crandall et al. ............ 349/100 |
| 6,122,028 A | * | 9/2000 | Gilmour et al. ............. 349/100 |
| 6,243,065 B1 | * | 6/2001 | Robrish et al. ............... 349/97 |
| 6,313,893 B1 | * | 11/2001 | Knox et al. .................... 349/74 |

* cited by examiner

Primary Examiner—Kenneth Parker

(57) ABSTRACT

A color, high-throughput, ferroelectric liquid crystal-based light valve comprising a light input, a light output, a beam splitter, a color separator, reflective spatial light modulators, and a switchable half-wave plate. Light polarized parallel to a first direction is received through the light input. Light from the light input and reflected by the spatial light modulators is output from the light output. The reflective spatial light modulators are structured as a quarter-wave plates and each has a principal axis that switches through an angle $\phi$. The beam splitter has orthogonal directions of maximum transmissivity and maximum reflectivity, one of which is parallel to the first direction. The beam splitter is located and aligned relative to the light input, the light output, and the color separator to transmit or reflect the light from the light input towards the color separator, and to reflect or transmit, respectively, towards the light output the light reflected by each of the spatial light modulators and having a direction of polarization substantially orthogonal to the first direction. The switchable half-wave plate is located between the beam splitter and the color separator, is structured as a half-wave plate and has a principal axis that switches through an angle $\theta$, substantially equal to $\phi/2$. The switchable half-wave plate inverts the sense of the light valve during the balance period of each display period to enable the light valve to generate a positive image, and therefore be illuminated, during the balance period in addition to during the illumination period.

23 Claims, 13 Drawing Sheets

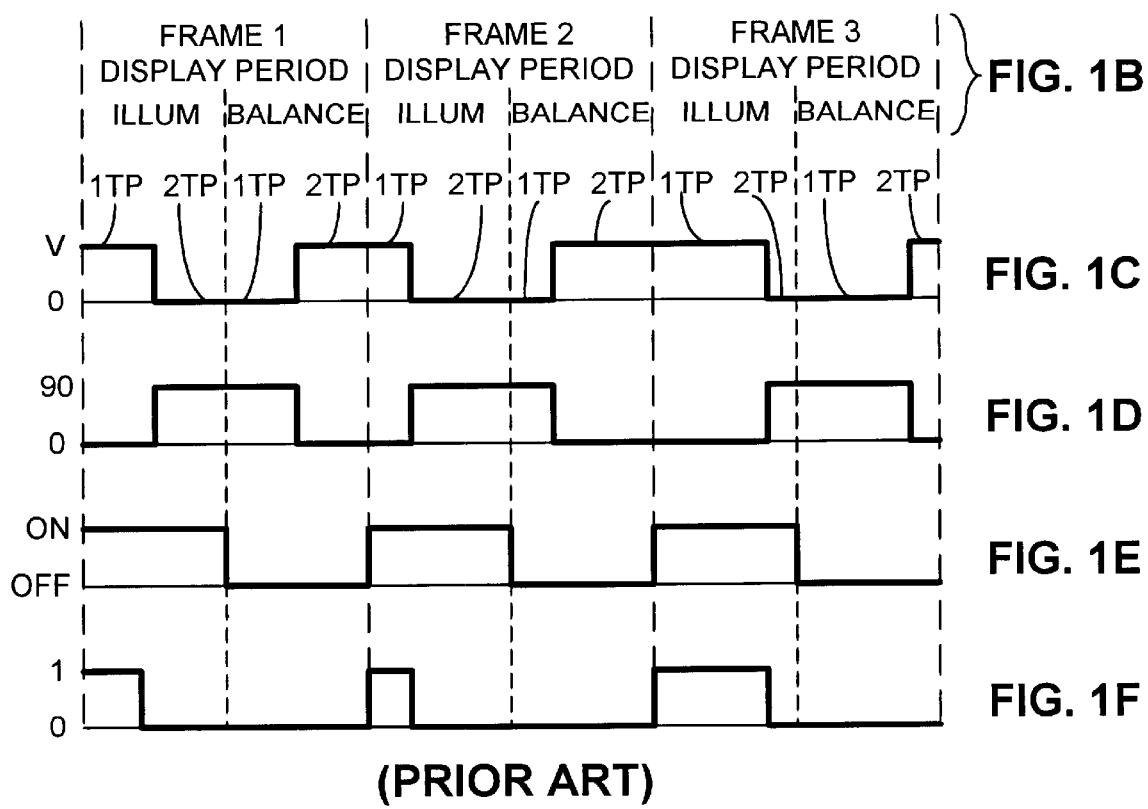
(PRIOR ART)

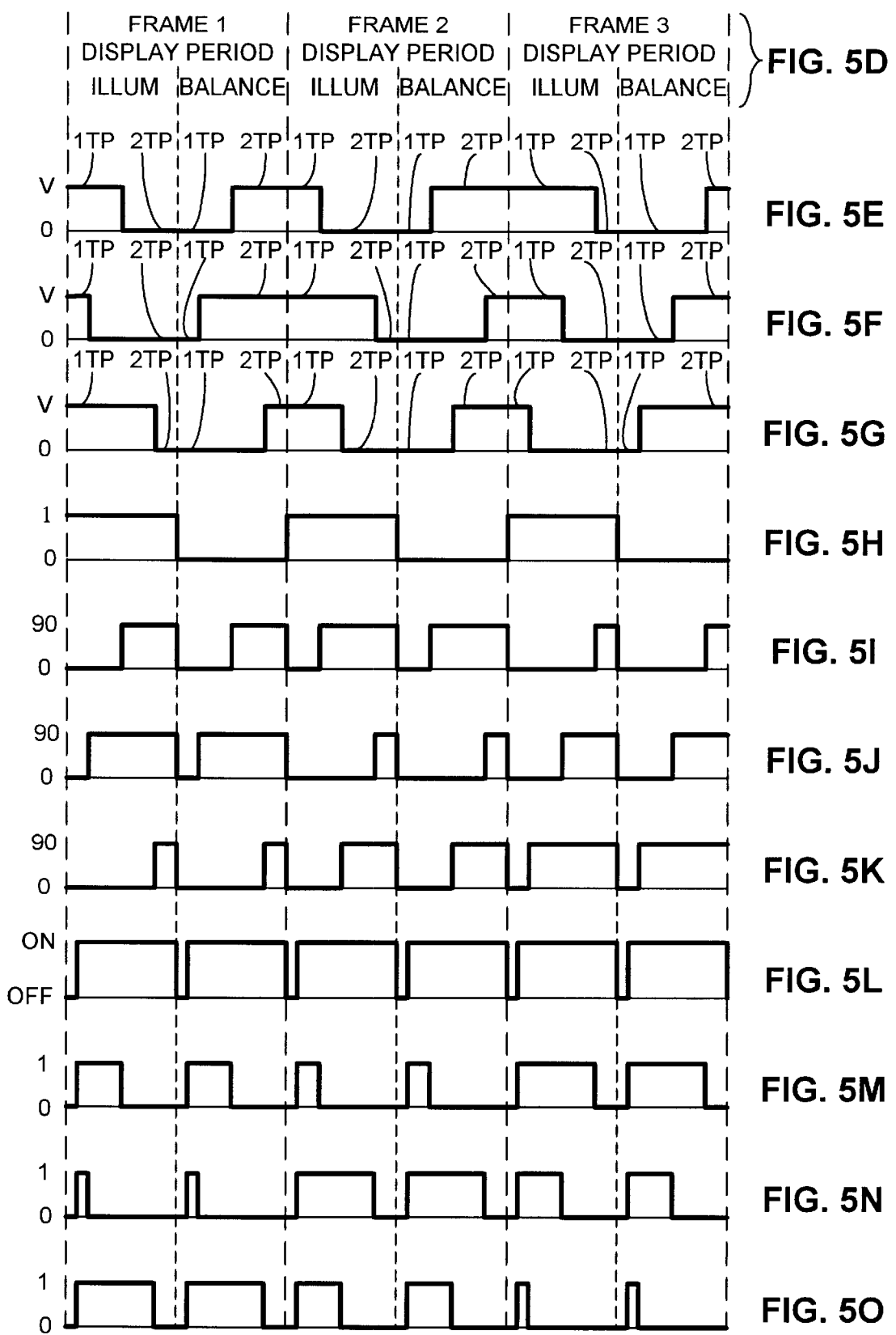

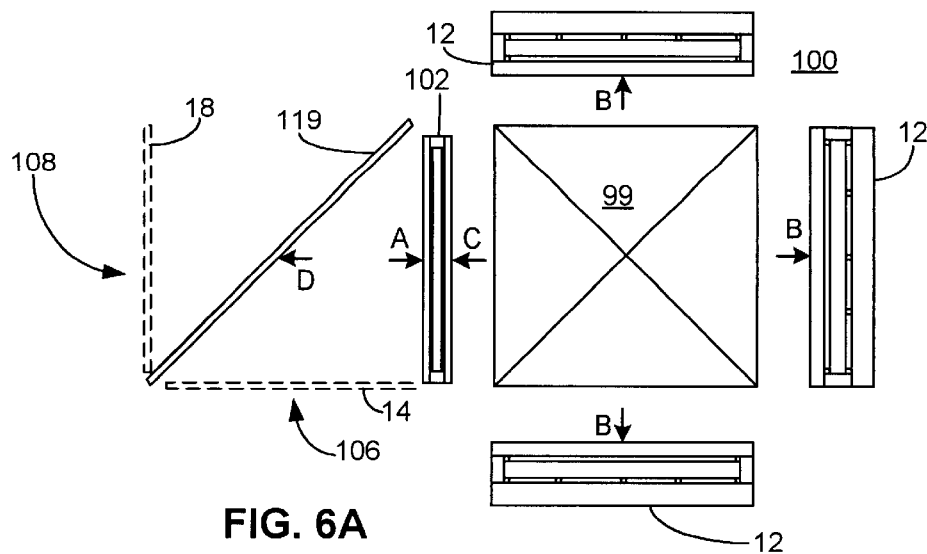
FIG. 6A
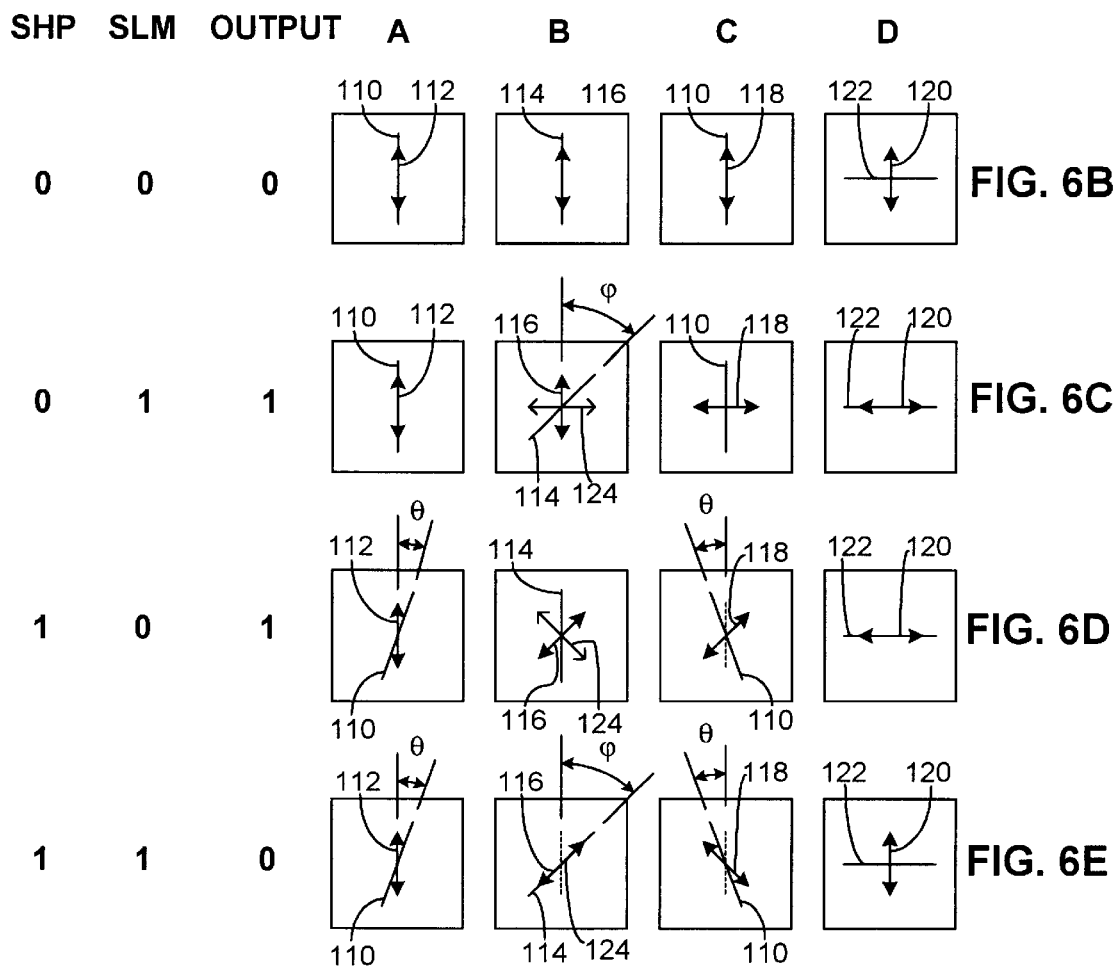

COLOR REFLECTIVE FERROELECTRIC LIQUID CRYSTAL LIGHT VALVE WITH THREE SPATIAL LIGHT MODULATORS AND INCREASED LIGHT THROUGHPUT

FIELD OF THE INVENTION

The invention relates to reflective ferroelectric liquid crystal-based light valves such as those used in video displays and in particular relates to such light valves for forming color images and having a substantially increased light throughput.

BACKGROUND OF THE INVENTION

A need exists for various types of color video and graphics display devices with improved performance and lower cost. For example, a need exists for miniature color video and graphics display devices that are small enough to be integrated into a helmet or a pair of glasses so that they can be worn by the user. Such wearable color display devices would replace or supplement the conventional displays of computers and other devices. A need also exists for a replacement for the conventional cathode-ray tube used in many display devices including computer monitors, conventional and high-definition television receivers and large-screen displays. Both of these needs can be satisfied by display devices that incorporate a light valve that uses as its light control element three reflective spatial light modulators, each based on a ferroelectric liquid crystal (FLC) material.

A FLC-based spatial light modulator is composed of a layer of a FLC material, preferably a surface-stabilized FLC material, sandwiched between a transparent electrode and a reflective electrode that is segmented into an array of pixel electrodes to define the picture elements (pixels) of the spatial light modulator. The reflective electrode is located on the surface of a silicon substrate that also accommodates the drive circuits that derive the drive signals for the pixel electrodes from an input video signal.

The direction of an electric field applied between each pixel electrode and the transparent electrode determines whether or not the corresponding pixel of the spatial light modulator rotates the direction of polarization of light reflected by the pixel. The reflective spatial light modulator is constructed as a quarter-wave plate so that the polarized light reflected by the pixels of the spatial light modulator is either rotated by 90° or not depending on the direction of the electric field applied to each pixel. A polarization analyzer is in the optical path of the light reflected by the spatial light modulator. The polarization analyzer is aligned to either: 1) transmit the polarized light which has rotated and absorb the polarized light which as not been rotated; or 2) transmit the polarized light which as not rotated and to absorb the polarized light which has been rotated. The resulting optical characteristics of each pixel of the spatial light modulator are binary: the light reflected by the pixel either is transmitted through the polarization analyzer (its 1 state) or is absorbed by the polarization analyzer (its 0 state), and therefore appears light or dark, depending on the direction of the electric field.

To produce the grey scale required for conventional display devices, the apparent brightness of each pixel is varied by temporally modulating the light transmitted by each pixel. The light is modulated by defining a basic time period that will be called the illumination period of the spatial light modulator. The pixel electrode is driven by a drive signal that switches the pixel from its 1 state to its 0 state. The duration of the 1 state relative to the duration of the illumination period determines the apparent brightness of the pixel.

Ferroelectric liquid crystal-based spatial light modulators suffer the disadvantage that, after each time the drive signal has been applied to a pixel electrode to cause the pixel to modulate the light passing through it, the DC balance of the pixel must be restored. This is typically done by defining a second basic time period called the balance period, equal in duration to the illumination period, and driving the pixel electrode with a complementary drive signal having 1 state and 0 state durations that are complementary to the 1 state and 0 state durations of the drive signal during the illumination period. The illumination period and the balance period collectively constitute a display period. To prevent the complementary drive signal from causing the display device to display a substantially uniform, grey image, the light source illuminating the light valve is modulated, either directly or with a shutter, so that the light valve is only illuminated during the illumination period, and is not illuminated during the balance period. However, modulating the light source as just described reduces the light throughput of the light valve to about half of that which could be achieved if DC balance restoration were unnecessary. This means that a light source of approximately twice the intensity, with a corresponding increase in cost, is necessary to achieve a given display brightness. Additionally or alternatively, projection optics with a greater aperture, also with a corresponding increase in cost, are necessary to achieve a given brightness.

FIG. 1A shows part of a conventional display device 5 incorporating a conventional reflective light valve 10 that includes the reflective spatial light modulator 12. Other principal components of the light valve are the polarizer 14, the beam splitter 16 and the analyzer 18. The light valve is illuminated with light from the light source 20, the light from which is concentrated on the polarizer using a reflector 22 and collector optics 24. The light output by the light valve passes to the imaging optics 26 that focus the light to form an image (not shown). The light valve 10, light source 20 and imaging optics may be incorporated into various types of display device, including miniature, wearable devices, cathode-ray tube replacements, and projection displays.

Light generated by the light source 20 enters the light valve 10 by passing through the polarizer 14. The polarizer polarizes the light output from the light source. Alternatively, a polarized light source (not shown) can be used and the need for the polarizer 14 would be eliminated. The beam splitter 16 then reflects a fraction of the polarized light output from the polarizer towards the spatial light modulator 12. The beam splitter can additionally or alternatively be a polarizing beam splitter configured to reflect light having a direction of polarization parallel to the direction of polarization of the polarizer 14 towards the spatial light modulator 12. The spatial light modulator 12 is divided into a two-dimensional array of picture elements (pixels) that define the spatial resolution of the light valve 10. Light reflected from the spatial light modulator can pass to the beam splitter 16 which transmits a fraction of the reflected light to the analyzer 18. If the beam splitter is a polarizing beam splitter, however, only light having a direction of polarization orthogonal to the direction of polarization imparted by the polarizer will be transmitted and the need for an independent analyzer would be eliminated.

The direction of an electric field in each pixel of the spatial light modulator 12 determines whether or not the direction of polarization of the light reflected by the pixel is rotated by 90° relative to the direction of polarization of the incident light. The light reflected by each pixel of the spatial light modulator passes through the beam splitter 16 and the analyzer 18 and is output from the light valve 10 through the imaging optics 26 depending on whether or not its direction of polarization was rotated by the spatial light modulator.

More specifically, the polarizer 14 polarizes the light generated by the light source 20 that passes through the collector optics 24 either directly or after reflecting off reflector 22. The polarization is preferably linear polarization. The beam splitter 16 reflects the polarized light output from the polarizer towards spatial light modulator 12, and the polarized light reflected from the spatial light modulator transmits to the analyzer 18 through the beam splitter 16. The direction of maximum transmission of the analyzer is orthogonal to that of the polarizer in this example.

For purposes of this description, the terms parallel and orthogonal will be used to describe directions of polarization and directions of maximum transmissivity and maximum reflectivity. When these terms are used within this description, it is understood that they relate to the optical characteristics of the light and of the various components that comprise the light valve and not necessarily to their spatial relationships. For example, when polarized light reflects from a mirror at an angle of incidence of 45°, the polarized light is reflected at an angle of 90° relative to the incident light. Even though the incident light and the reflected light are spatially orthogonal to one another, the direction of polarization of the reflected light will be optically unchanged from the direction of polarization of the incident light. Thus, the direction of polarization of the reflected light may be said to be parallel to the direction of polarization of the incident light. In addition, as used herein the term parallel shall include directions that are both parallel and anti-parallel, i.e., having a direction 180° opposed, to the original direction.

The spatial light modulator 12 is composed of a transparent electrode 28 deposited on the surface of a transparent cover 30, a reflective electrode 32 located on the surface of the semiconductor substrate 34, and a ferroelectric liquid crystal layer 36 sandwiched between the transparent electrode 28 and the reflective electrode 32. The reflective electrode is divided into a two-dimensional array of pixel electrodes that define the pixels of the spatial light modulator and of the light valve. A substantially reduced number of pixel electrodes are shown to simplify the drawing. For example, in a light valve for use in a large-screen computer monitor, the reflective electrode could be divided into a two-dimensional array of 1600×1200 pixel electrodes. An exemplary pixel electrode is shown at 38. Each pixel electrode reflects the portion of the incident polarized light that falls on it towards the beam splitter 16.

A drive circuit (not shown), which may be located in the semiconductor substrate 34, applies a drive signal to the pixel electrode 38 of each pixel of the spatial light modulator 12. The drive signal has two different voltage levels, and the transparent electrode 28 is maintained at a fixed potential mid-way between the voltage levels of the drive signal. The potential difference between the pixel electrode and the transparent electrode establishes an electric field across the part of the liquid crystal layer 36 between the pixel and transparent electrodes. The direction of the electric field determines whether the liquid crystal layer rotates the direction of polarization of the light reflected by the pixel electrode, or leaves the direction of polarization unchanged.

Since light passes through the reflective spatial light modulator twice, once before and once after reflection by the reflective pixel electrodes, the reflective spatial light modulator 12 is structured as a quarter-wave plate. The thickness of the layer of ferroelectric liquid crystal material in the liquid crystal layer 36 is chosen to provide an optical phase shift of 90° between light polarized parallel to the director of the liquid crystal material and light polarized perpendicular to the director. The liquid crystal material is preferably a Smectic C* surface stabilized ferroelectric liquid crystal material having an angle of 22.5° between its director and the normal to its smectic layers. Reversing the direction of the electric field applied to such a liquid crystal material switches the director of the material through an angle of about 45°. Consequently, if the director is aligned parallel to the direction of maximum transmission of the analyzer 18 with one polarity of the electric field, reversing the direction of the electric field will rotate the direction of polarization of light reflected by the pixel through 90°. This will align the direction of polarization of the light perpendicular to the direction of maximum transmission of the analyzer, and will change the pixel from its 1 state, in which the pixel appears bright, to its 0 state, in which the pixel appears dark.

In a miniature, wearable display, the imaging optics 26 are composed of an eyepiece that receives the light reflected by the reflective electrode 32 and forms a virtual image at a predetermined distance in front of the user (not shown). In a cathode-ray tube replacement or in a projection display, the imaging optics are composed of projection optics that focus an image of the reflective electrode on a transmissive or reflective screen (not shown). Optical arrangements suitable for use as an eyepiece or projection optics are well known in the art and will not be described here.

Since the direction of maximum transmission of the analyzer 18 is orthogonal to the direction of polarization defined by the polarizer 14, light whose direction of polarization has been rotated through 90° by a pixel of the spatial light modulator 12 will pass through the analyzer and be output from the light valve 10 whereas light whose direction of polarization has not been rotated will not pass through the analyzer. The analyzer only transmits to the imaging optics 26 light whose direction of polarization has been rotated by pixels of the spatial light modulator. The pixels of the spatial light modulator will appear bright or dark depending on the direction of the electric field applied to each pixel. When a pixel appears bright, it will be said to be in its 1 state, and when the pixel appears dark, it will be said to be in its 0 state.

The direction of maximum transmission of the analyzer 18 can alternatively be arranged parallel to that of the polarizer 14, and a non-polarizing beam splitter can be used as the beam splitter 16. In this case, the spatial light modulator 12 operates in the opposite sense to that just described.

To produce the grey scale required by a display device notwithstanding the binary optical characteristics of the pixels of the light valve 10, the apparent brightness of each pixel is varied by temporally modulating the light reflected by the pixel, as described above. The drive circuit (not shown) for each pixel of the spatial light modulator determines the duration of the 1 state of the pixel in response to a portion of the input video signal 40 corresponding to the location of the pixel in the spatial light modulator.

FIGS. 1B–1F illustrate the operation of the exemplary pixel 38 of the conventional light valve 10 shown in FIG. 1A during three consecutive display periods. The remaining pixels operate similarly. In one embodiment of a conventional light valve, each display period corresponded to one frame of the input video signal 40. In another embodiment, each display period corresponded to a fraction of one frame of the input video signal. Each display period is composed of an illumination period (ILLUM) and a balance period (BALANCE) having equal durations, as shown in FIG. 1B.

FIG. 1C shows the drive signal applied to the exemplary pixel electrode 38. The transparent electrode 28 is held at a voltage level of V/2, so that changing the voltage level on the pixel electrode from 0 to V reverses the direction of the electric field applied to the ferroelectric liquid crystal layer 36. The level of the drive signal is V for a first temporal portion 1TP of each illumination period. The level of the drive signal is 0 for the second temporal portion 2TP constituting the remainder of the illumination period, and also for the first temporal portion 1TP of the subsequent balance period. The first temporal portion of the balance period has a duration equal to the first temporal portion of the illumination period. However, the level of the drive signal is 0 during the first temporal portion of the balance period, whereas the level of the drive signal is V during the first temporal portion of the illumination period. Finally, the level of the drive signal changes to V for the second temporal portion 2TP constituting the remainder of the balance period. Consequently, during the balance period, the level of the drive signal is 0 and V for times equal to the times that it was at V and 0, respectively, during the illumination period. As a result, the electric field applied to the liquid crystal material of the pixel averages to zero over the display period.

In the example shown, the duration of the first temporal portion 1TP of the drive signal is different in each of the three illumination periods. The duration of the first temporal portion, and, hence, of the second temporal portion, of each illumination period depends on the voltage level of the corresponding sample of the input video signal 40.

FIG. 1D shows the effect of the spatial light modulator 12 on the direction of polarization of the light impinging on the analyzer 18. The direction of polarization is indicated by the absolute value of the angle $\alpha$ between direction of polarization of the light impinging on the analyzer and the direction of maximum transmissivity of the analyzer. The analyzer transmits light having an angle $\alpha$ close to zero and absorbs light having an angle $\alpha$ close to 90°. In each display period, the angle $\alpha$ has values corresponding to the pixel being bright and dark for equal times due to the need to restore the DC balance of the pixel.

FIG. 1E shows the condition of a fast-acting light source 20. The light source is ON throughout the illumination period of each display period, and is OFF during the following balance period. Alternatively, the light source could remain on and a shutter (not shown) could be used to control whether the light generated by the light source illuminates the spatial light modulator 12. For example, an open shutter would correspond to the light source being ON and a closed shutter would correspond to the light source being OFF.

FIG. 1F shows the light output from the exemplary pixel of the light valve 10 controlled by the pixel electrode 38. Light is output from the pixel only during the first temporal portion of the illumination period of each display period. No light is output during the second temporal portion of the illumination period. Moreover, no light is output during the balance period of the display period because the light source 20 is OFF during the balance period.

The light valve 10 shown in FIG. 1A can also be adapted to provide a colored light output to the imaging optics 26. One way that this can be done is by replacing the "white" light source 20 with three colored light sources such as a red, blue and green LEDs (not shown), each illuminating the spatial light modulator 12 sequentially. This would require a balance period after each sequential illumination period. Another way that a colored light output can be provided is by replacing the single reflective spatial light modulator 12 shown in FIG. 1A with three reflective spatial light modulators and a color separator for separating the light into three component colors.

An example of one such color configuration is depicted in FIG. 2. Regarding this figure and those that follow, it is noted that identical reference numerals are used to designate identical or similar elements throughout the several views, and that elements are not necessarily shown to scale. In FIG. 2, the color separator is a series of three dichroic plates 42,43,44, each having an associated reflective spatial light modulator 12. Each of the dichroic plates is configured to reflect light in a band of wavelengths (colorband) particular to that dichroic plate and to pass the remaining wavelengths of light. Thus, if the light source 20 is a "white" light, emitting visible light across the entire visible color spectrum, a particular portion of the color spectrum may be reflected by each dichroic plate its associated reflective spatial light modulator simultaneously. This eliminates the need for sequential illumination and improves the perceived brightness of the color pixels passing through the analyzer.

For example, the dichroic plate 42 nearest the beam splitter 16 might reflect red-colored light toward its associated spatial light modulator 12 while the center dichroic plate 43 reflects green-colored light toward its associated spatial light modulator and the dichroic plate remote from the beam splitter 44 reflects blue-colored light towards its spatial light modulator. When the light source 20 is ON, as shown if FIG. 2, the colored light reflected by the dichroic plates passes to each of the three reflective spatial light modulators 12. Each of the three reflective spatial light modulators is capable of reflecting pixels of the colored light back at its associated dichroic plate in a manner consistent with the above description of the operation of the spatial light modulator shown in FIG. 1A.

The majority of the colored light reflected by each of the spatial light modulators 12 will be reflected by its associated dichroic plate toward the analyzer 18 since the light reflected by each spatial light modulator will retain the characteristic wavelengths of light originally reflected by its respective dichroic plate. When the combined colored light from each of the three reflective spatial light modulators 12 passes through the analyzer, a full color image can be formed by the imaging optics 26.

FIG. 3 depicts the use of a color separation cube 46, sometimes known as an x-cube or crossed-dichroic cube, as a color separator in place of the three dichroic plates. As with the three dichroic plates, the color separation cube separates three distinct color bands from the "white" light created by light source 20 and directs each of the color bands to a particular spatial light modulator 12. The color separation cube 46 also recombines the light reflected from each of the spatial light modulators 12 and directs the combined light toward the analyzer 18. The use of a color separation cube allows for a more compact design utilizing three spatial light modulators than can be achieved using three separate dichroic plates.

FIG. 4 depicts the use of a third type of color separator, a three-prism color separator 48 (sometimes known as a Philips cube or Philips prism), in a light valve utilizing three spatial light modulators to generate a color image. The design and use of a three-prism color separator is described in detail in U.S. Pat. No. 5,644,432, the contents of which are incorporated herein by reference. Like the previously described color separators, the three-prism color separator separates three distinct color bands from the "white" light created by light source 20 and directs each of the color bands to a particular spatial light modulator 12. The three-prism color separator 48 also recombines the light reflected from each of the spatial light modulators 12 and directs the combined light toward the analyzer 18. The three-prism color separator has the advantage over the three dichroic plates and the color separation cube in that it typically does a better job of recombining the reflected light from each of the spatial light modulators into a single color image.

While the use of dichroic plates, a color separation cube, or three-prism color separator allows color images to be formed by three ferroelectric liquid crystal-based spatial light modulators and a "white" light source, each of the spatial light modulators still suffers the disadvantage that the DC balance of the pixel must be restored. As with the single spatial light modulator discussed above, DC balance is typically achieved by defining a balance period and driving the pixel electrode with a complementary drive signal having 1 state and 0 state durations that are complementary to the 1 state and 0 state durations of the drive signal during the illumination period. The "white" light source is typically modulated during the balance period to prevent the complementary drive signal from causing the display device to display a substantially uniform, grey image. Modulating the light source as just described, however, reduces the light throughput of the light valve to about half of that which could be achieved if DC balance restoration were unnecessary. This means that a light source of approximately twice the intensity, with a corresponding increase in cost, is necessary to achieve a given display brightness. Additionally or alternatively, projection optics with a greater aperture, also with a corresponding increase in cost, are necessary to achieve a given brightness.

Consequently, what is needed is a color light valve utilizing three reflective ferroelectric liquid crystal spatial light modulators that can remain illuminated during the balance period so that the light throughput of the light valve can be approximately twice that of a conventional, color light valve utilizing three spatial light modulators.

SUMMARY OF THE INVENTION

The invention provides a high throughput color light valve that comprises a light input, a light output, a beam splitter, a color separator, a switchable half-wave plate, and reflective ferroelectric liquid crystal based spatial light modulators. Light having a direction of polarization parallel to a first direction is received through the light input. The light received at the light input is output from the light output after reflection by at least one of the spatial light modulators. The reflective spatial light modulators are each structured as a quarter-wave plate and each has a principal axis that independently switches through an angle of rotation substantially equal to $\phi$. The color separator is configured to separate the light received at the light input into colorbands, and also to distribute the colorbands to the spatial light modulators. The beam splitter is located and aligned relative to the light input, the light output, the color separator and the spatial light modulators either to reflect or transmit the light received at the light input towards the color separator, and transmit or reflect, respectively, towards the light output the light reflected by the spatial light modulators. The switchable half-wave plate is located between the beam splitter and the color separator, is structured as a half-wave plate, and has a principal axis that switches through an angle of rotation $\theta$ substantially equal to $\phi/2$.

The spatial light modulators may include a first, second, and third spatial light modulator, and the color separator may separate a first, second, and third color waveband from the light received at the light input. The beam splitter may include a polarizing beam splitter with orthogonal directions of maximum transmissivity and maximum reflectivity, one of the directions being parallel to the first direction.

The switchable half-wave plate may include a pair of opposed transparent electrodes and a layer of liquid crystal material sandwiched between the electrodes. The liquid crystal material may be a ferroelectric liquid crystal material or a nematic liquid crystal material. Alternatively, the direction of the principal axis of the switchable half-wave plate may be mechanically switched.

The color separator may include three dichroic plates, a color separation cube, or a three-prism color separator.

The invention also provides a method of increasing the light throughput of a multi-color component reflective light valve that requires DC balancing. In the method, a reflective light valve is provided that includes a first, second, and third reflective spatial light modulator and a polarizing beam splitter. The polarizing beam splitter has orthogonal directions of maximum transmissivity and maximum reflectivity, one of which defines the direction of polarization of light incident on the reflective spatial light modulators, the other of which defines the direction of polarization of light output from the light valve. Each of the spatial light modulators has a principal axis independently switchable between a first direction and a second direction. The second direction is substantially at an angle $\phi$ to the first direction. Also provided is a switchable half-wave plate that has a principal axis switchable between a third direction and a fourth direction. The fourth direction is at an angle $\theta$ to the third direction.

The switchable half-wave plate is inserted into the light valve between the polarizing beam splitter and the color separator with the third direction aligned parallel to the first direction. The spatial light modulators are operated in a first time period and a second time period equal to the first time period with each principal axis independently in the first direction for a portion of the first time period, in the second direction for the remainder of the first time period and a portion of the second time period, and in the first direction for the remainder of the second time period. The portion of the second time period is equal in duration to the portion of the first time period, and the portion of the second time period and the remainder of the second time period are in any temporal order. The switchable half-wave plate is operated with its principal axis in the third direction through the first period and in the fourth direction through the second period, and with the angle $\theta$ substantially equal to $\phi/2$.

A switchable half-wave plate may be provided in which the principal axis switches between the third direction and the fourth direction in a switching time, and the method may additionally comprise illuminating the light valve with light, and reducing the intensity of the light during the switching time of the switchable half-wave plate.

Switching the switchable half-wave plate inverts the sense of the light valve relative to the direction of the electric field applied to the liquid crystal material of the spatial light modulator. When the first time period and the second time period correspond to the illumination period and the balance period of a display period, inverting the sense of the light valve during the balance period enables a display device incorporating the light valve to generate a positive image in both the illumination period and the balance period of the display period. Accordingly, the light valve can be illuminated during both the illumination period and the balance period. This almost doubles the light throughput of the light valve according to the invention compared with a conventional light valve.

BRIEF DESCRIPTION OF THE DRAWINGS

FIGS. 1B–1F illustrate the operation of the conventional reflective light valve shown in FIG. 1A.

FIGS. 5D–5O illustrate the operation of the reflective light valve according to the invention shown in FIG. 5A.

FIG. 6A is an schematic view of the high throughput color light valve according to the embodiment of the invention shown in FIG. 5A.

FIGS. 6B–6E show the relationship between the direction of polarization of the light at the points A–D shown in FIG. 6A and the elements of the high throughput color light valve shown in FIG. 6A.

DETAILED DESCRIPTION OF THE INVENTION

Figure 1A:
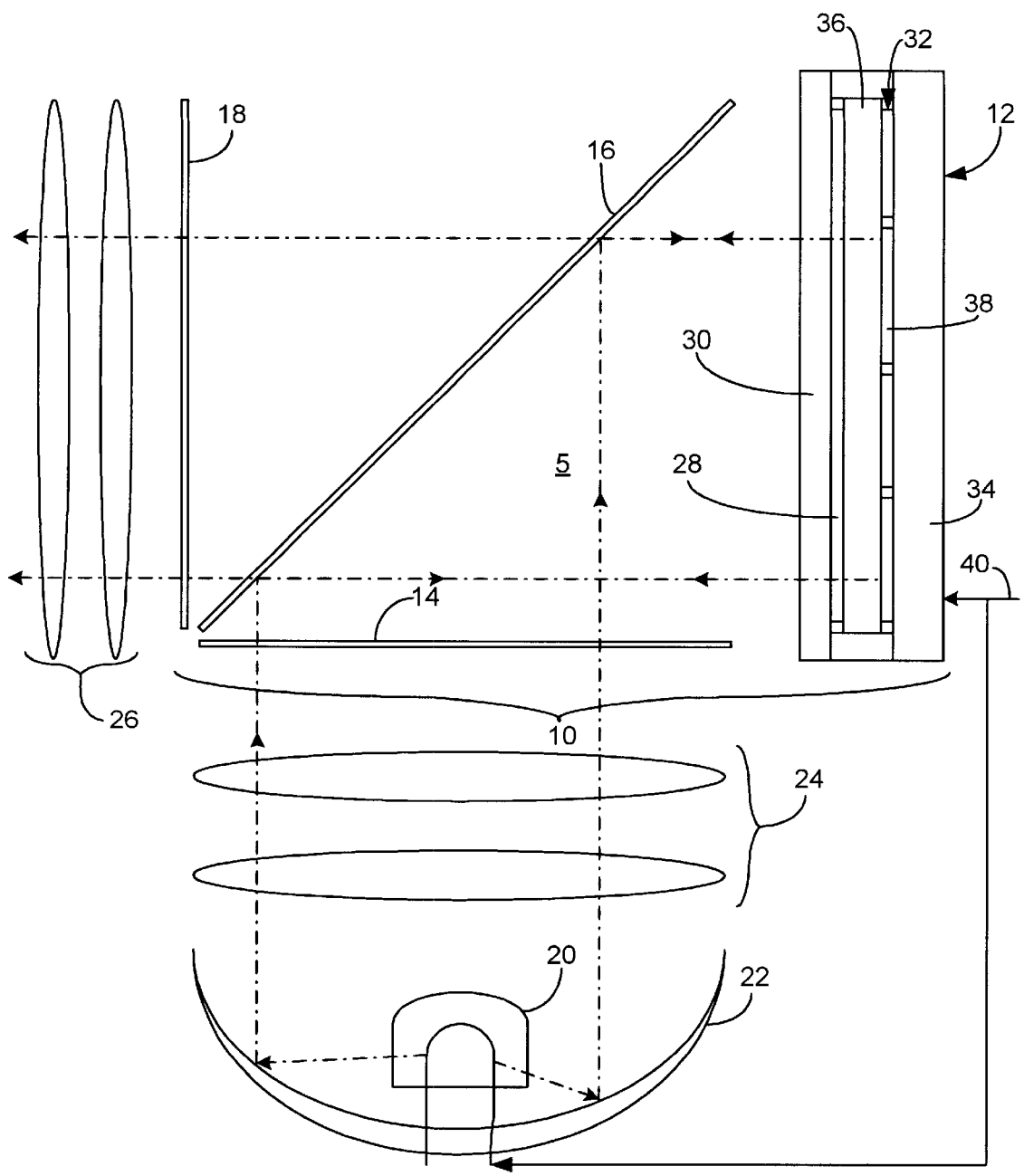
FIG. 1A is a schematic diagram of part of a display device incorporating a conventional reflective light valve with a single spatial light modulator.
Figure 2:
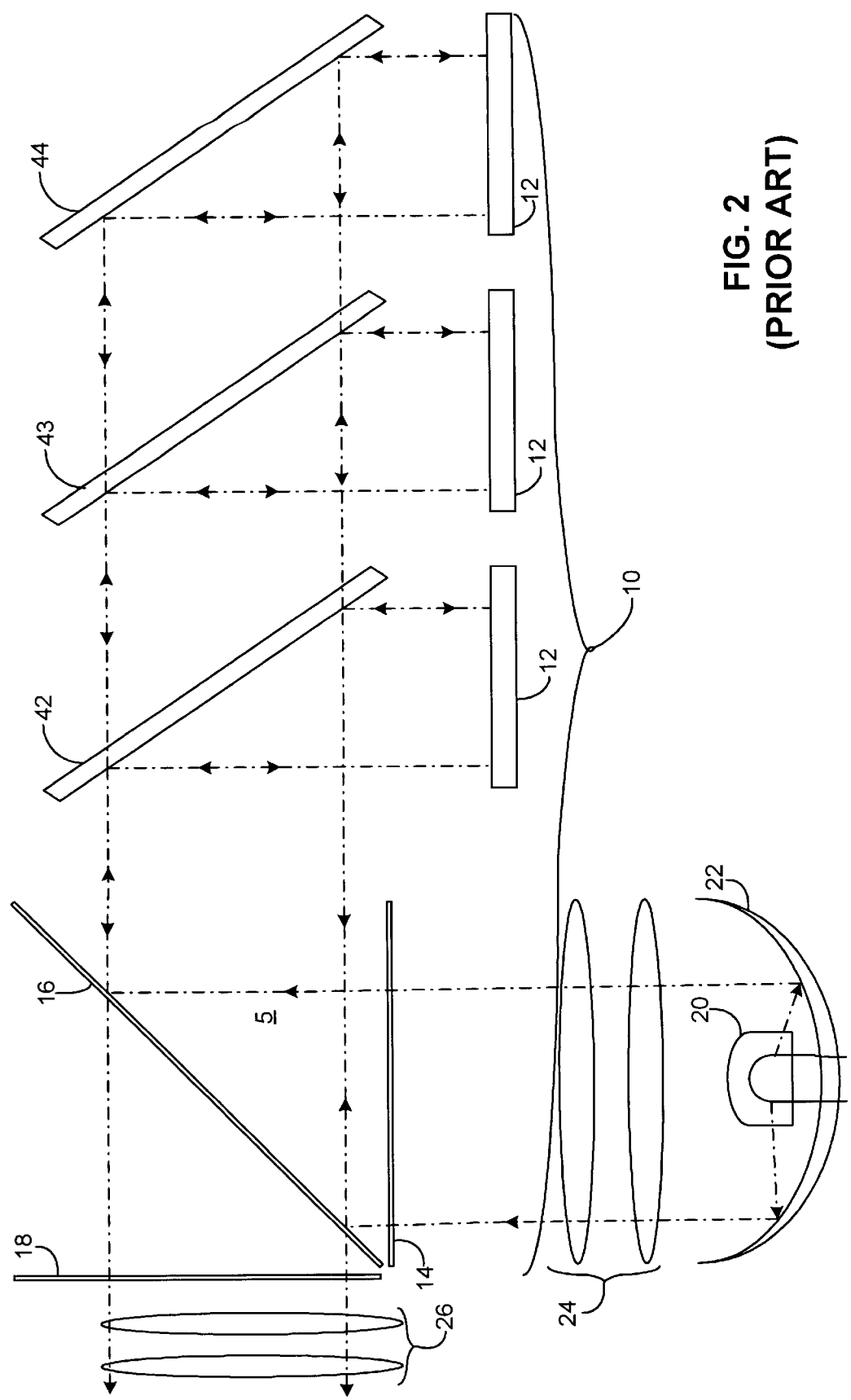
FIG. 2 is a schematic diagram of part of a display device incorporating a conventional reflective light valve with three spatial light modulators and three dichroic plates.
Figure 3:
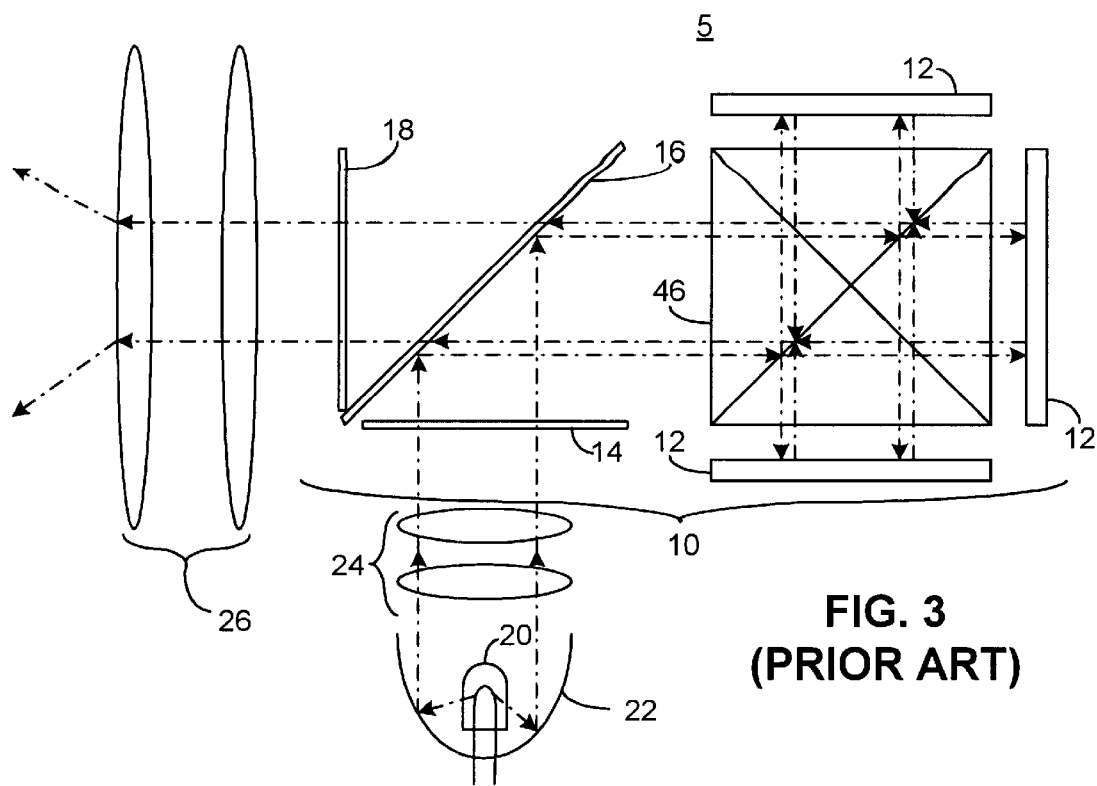
FIG. 3 is a schematic diagram of part of a display device incorporating a conventional reflective light valve with three spatial light modulators and a color separation cube.
Figure 4:
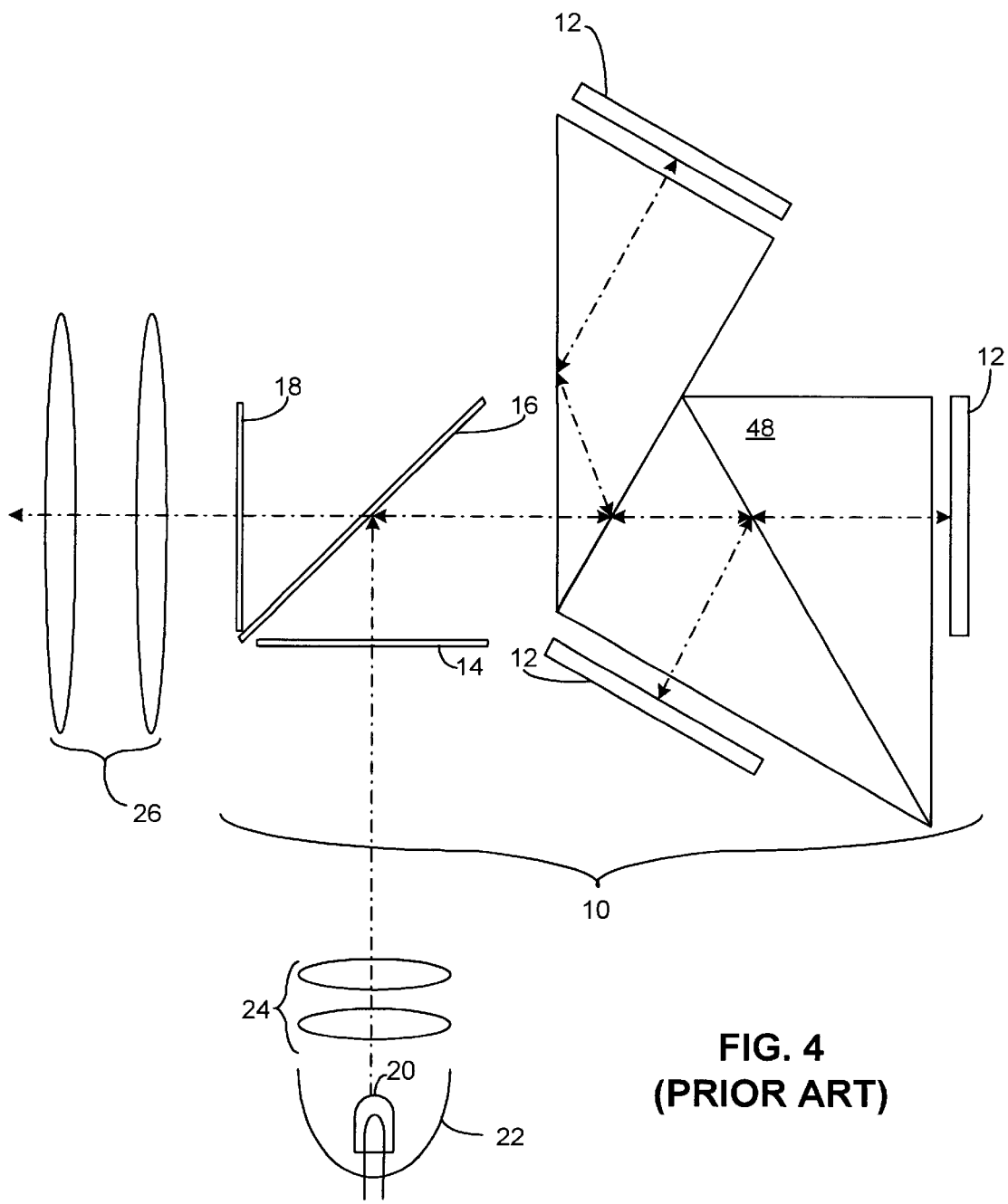
FIG. 4 is a schematic diagram of part of a display device incorporating a conventional reflective light valve with three spatial light modulators and a three-prism color separator.
Figure 5A:
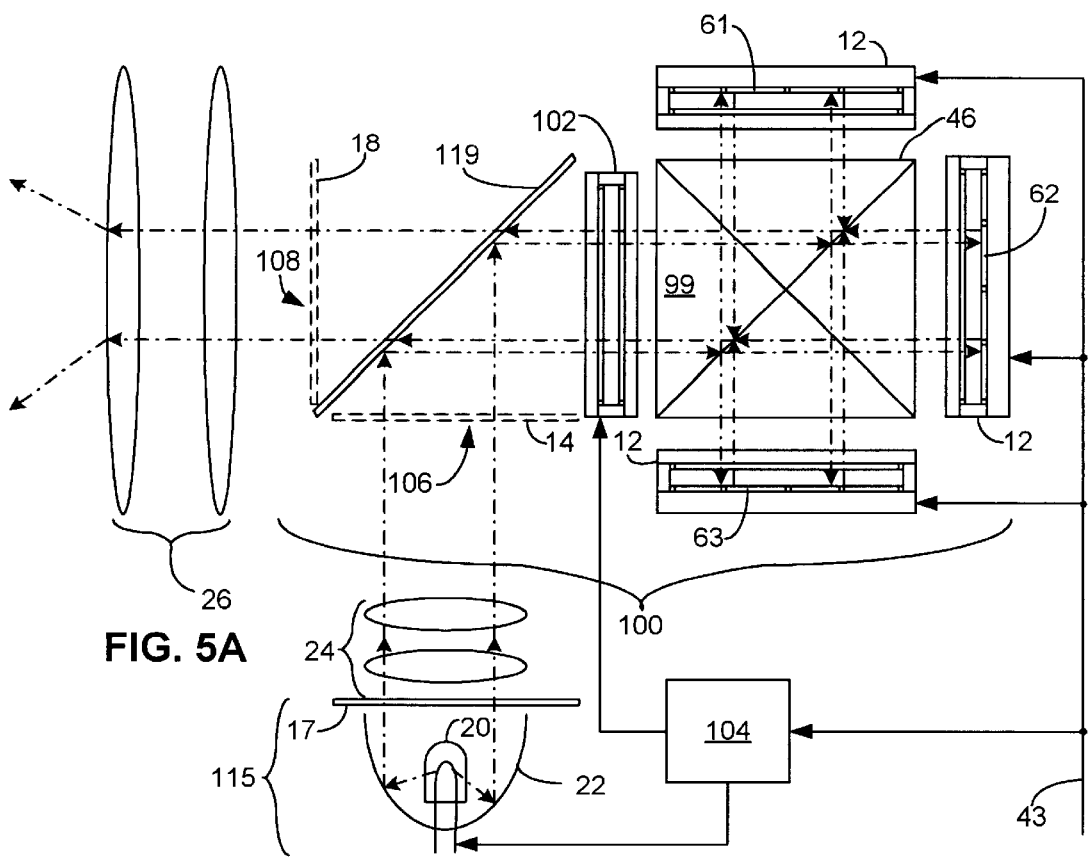
FIG. 5A is. a schematic diagram of part of a display device incorporating a high throughput color light valve with a liquid crystal switchable half-wave plate and a color separation cube according to an embodiment the invention.
Figure 5B:
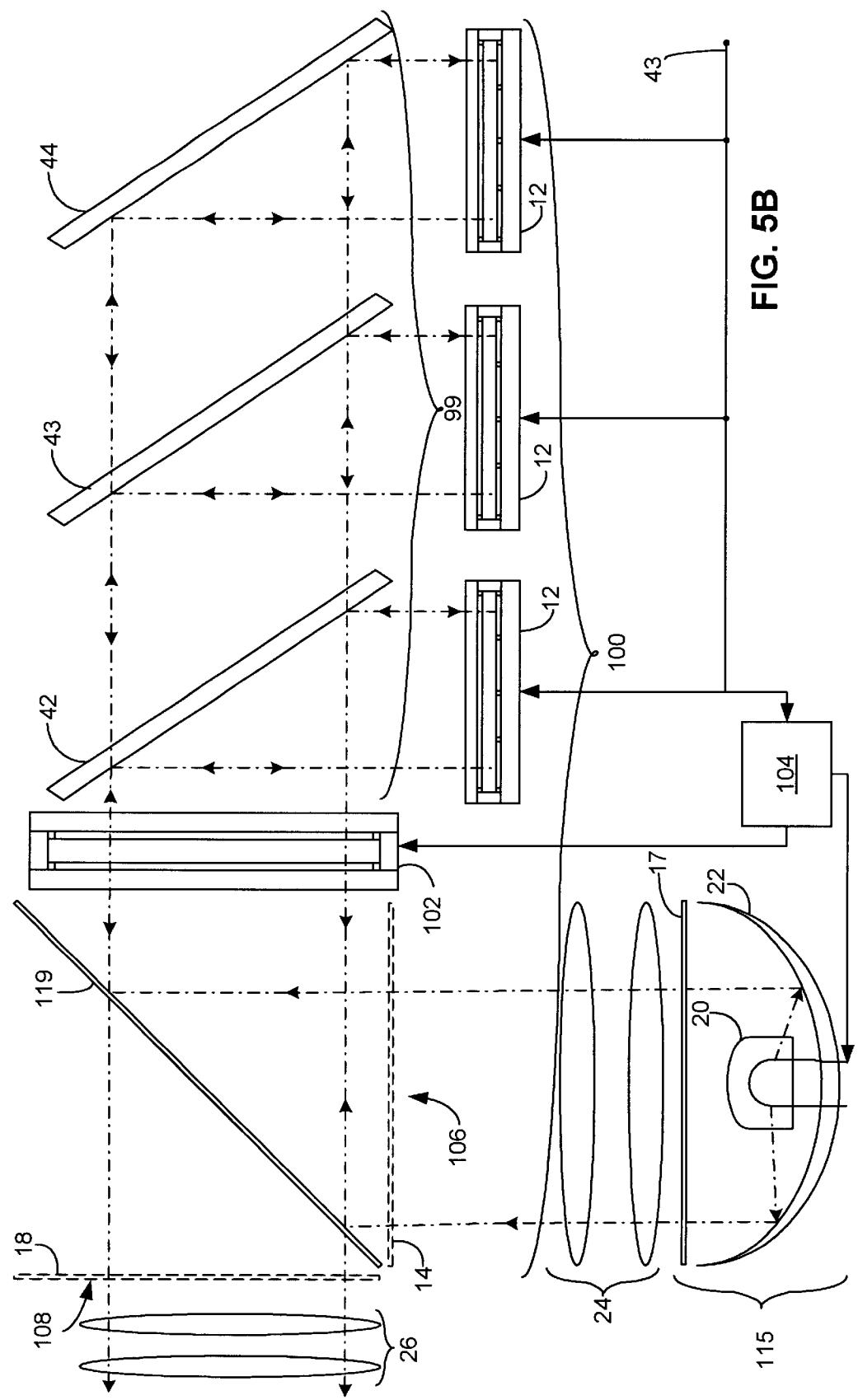
FIG. 5B is a schematic diagram of part of a display device incorporating a high throughput color light valve with a liquid crystal switchable half-wave plate and three dichroic plates according to an embodiment the invention.
Figure 5C:
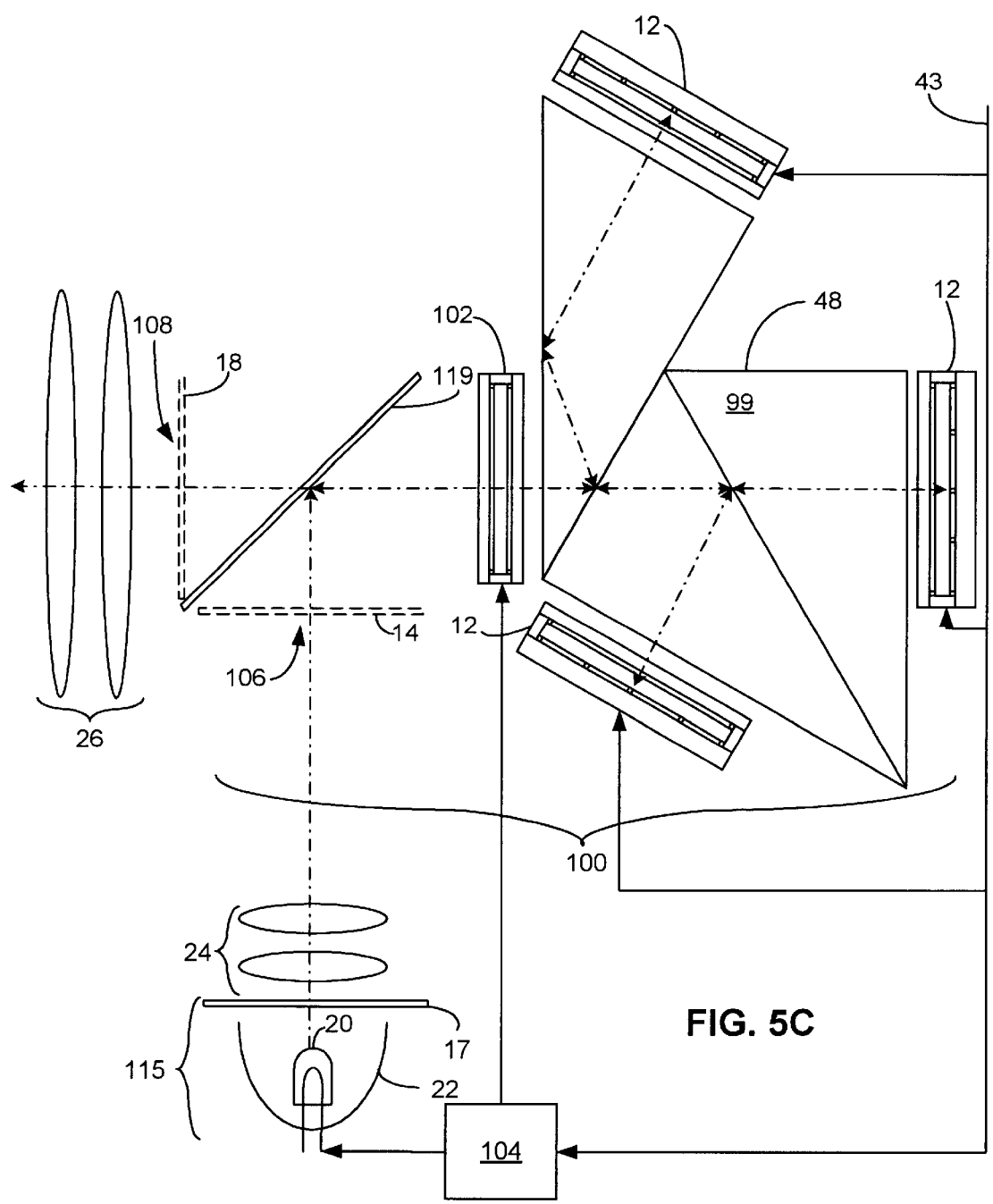
FIG. 5C is a schematic diagram of part of a display device incorporating a high throughput color light valve with a liquid crystal switchable half-wave plate and a three-prism color separator according to an embodiment the invention.

FIGS. 5A, 5B, and 5C are a schematic diagrams, each showing part of a display device incorporating the high throughput color light valve 100 according to the invention. Each of the light valves 100 shown in the FIGS. 5A, 5B and 5C functions in a substantially similar manner, with the only difference being the type of color separator 99 used. The following description of the operation of the light valve may be applied equally to the light valve depicted in all three Figures. Any distinctions between the operation of the light valves depicted will be noted below.

The light valve can be incorporated into various types of display devices, including miniature, wearable devices, cathode-ray tube replacements, and projection displays. The light valve 100 can be illuminated continuously or almost continuously, which enables a display device incorporating the light valve according to the invention to have a maximum brightness of approximately twice that obtained using a conventional light valve. Elements of the light valve shown in FIGS. 5A, 5B, and 5C that are identical to elements of the conventional light valves shown in FIGS. 1A, 2, 3 and 4 are indicated by the same reference numerals and will not be described again here.

The display device is composed of the high-throughput color light valve 100 having a light input 106 arranged to receive polarized "white" light generated by the polarized light source 115, and a light output 108 from which color spatially-modulated light is output to the imaging optics 26. The light valve additionally includes the beam splitter 119, the color separator 99, the spatial light modulators 12, and the switchable half-wave plate 102. The switchable half-wave plate is located between the beam splitter and the color separator.

The polarized light source 115 generates polarized "white" light. For purposes of this description "white" light is any light that includes a range visible wavelengths of light including at least wavelengths that appear substantially red, blue, and green. The polarized light source 115 includes at least a light source 20 and a light source polarizer 17. The light valve 100 receives the light generated by the polarized light source at the light input 106. Light passes from the light input to the beam splitter 119. The beam splitter is aligned relative to the light input, the light output 108, the color separator 99 and the spatial light modulators 12 to one of a) transmit and b) reflect a portion of the light received at the light input towards the color separator, and to the other of a) transmit and b) reflect towards the light output a portion of the light reflected by the spatial light modulators.

Preferably, the beam splitter 119 is a polarizing beam splitter having a direction of maximum reflectivity, and a direction of maximum transmissivity substantially orthogonal to the direction of maximum reflectivity. In FIG. 5A, 5B and 5C, the polarized light source is aligned so that the direction of the polarized light generated by the polarized light source 115, the first direction, is parallel to the direction of maximum reflectivity of the polarizing beam splitter 119. The polarizing beam splitter reflects the polarized light generated by the polarized light source towards the color separator 99. The polarizing beam splitter also transmits the light reflected by the spatial light modulators 12 to the light output 108 when the direction of polarization of the reflected light is parallel to its direction of maximum transmissivity.

Alternatively, the positions of the light input 106 and the light output 108 can be interchanged and the positions of the polarized light source 115 and the imaging optics 26 can be interchanged. Then, the polarizing beam splitter 119 can transmit the polarized light generated by the light source to the color separator 99, and can reflect towards the light output the light reflected by the spatial light modulators 12 when the direction of polarization of the reflected light is parallel to its direction of maximum reflectivity.

If the light output from the light source 115 is not strongly polarized, the light valve 100 may additionally include the polarizer 14, preferably having a direction of polarization parallel to the first direction. The polarizer is located between the light input 106 and the beam splitter 119. The polarizer defines the direction of polarization of the light controlled by the light valve and should be oriented with its direction of polarization parallel to the direction of maximum reflectivity of the polarizing beam splitter. Additionally or alternatively, if the angular discrimination of the transmissivity of the polarizing beam splitter is insufficient to provide a desired contrast in images generated by a display device incorporating the light valve 100, the light valve may include the analyzer 18. The analyzer is located between the polarizing beam splitter and the light output 108. References in this disclosure to a beam splitter will be understood to encompass a polarizing beam splitter alone, a polarizing beam splitter in combination with a polarizer or an analyzer or a polarizer and an analyzer, and a non-polarizing beam splitter in combination with a polarizer and an analyzer.

The color separator 99 is configured to separate the light received at the light input 106 and reflected or transmitted by the beam splitter 119 into colorbands, and to distribute the colorbands among the spatial light modulators. The color separator also functions to reconsolidate the colorbands of light reflected by each of the spatial light modulators into full-color light transmitted or reflected towards the beam splitter. Various types of color separators are known in the art including a color separation cube 46 (depicted in FIGS. 3 and 5A), a series of dichroic plates 42, 43, 44 (depicted in FIGS. 2 and 5B), and a three-prism color separator 48 (depicted in FIGS. 4, and 5C). The three types of color separators each perform identical functions within the light valve 100. Since the design, construction, and arrangement of color separators is known, they will not be described further herein.

In the light valve 100, the switchable half-wave plate 102 is located between the beam splitter 119 and the color separator 99. The switchable half-wave plate operates synchronously with the illumination and balance periods of the spatial light modulators 12 to invert the sense of the light valve relative to the direction of the electric field applied to the liquid crystal material of each of the spatial light modulators 12 during the balance period of each display period. Inverting the sense of the light valve during the balance period of the display period enables a display device incorporating the light valve to generate a positive image in both the illumination period and the balance period of the display period. Accordingly, the light valve can be illuminated during both the illumination period and the balance period. This almost doubles the light throughput of the light valve 100 compared with the conventional color light valves 10 shown in FIGS. 2, 3 and 4.

To invert the sense of the light valve 100 relative to the direction of the electric field applied to the liquid crystal material of the spatial light modulator 12 during the balance period of each display period, the direction of the principal axis of the switchable half-wave plate 102 is switched electrically, magnetically, mechanically or otherwise between two states. In the first of the two states, the 0 state, the switchable half-wave plate leaves the sense of operation of the light valve relative to the direction of the electric field applied to the liquid crystal material of each the spatial light modulators 12 unchanged. In this state, the direction of the principal axis of the switchable half-wave plate is preferably aligned parallel to the direction of polarization of the light output from the polarized light source 115. This corresponds to the direction of maximum reflectivity of the beam splitter 119. The direction of the principal axis may alternatively be aligned at an angle that is any integral multiple of 90° to the direction of polarization of the light generated by the polarized light source. In the second of the two states, the 1 state, the switchable half-wave plate inverts the sense of operation of the light valve relative to the direction of the electric field applied to the liquid crystal material of the spatial light modulator. In this state, the direction of the principal axis of the switchable half-wave plate is at a non-zero angle $\theta$ relative to the direction of the principal axis in the 0 state.

The angle $\theta$ through which the principal axis of the switchable half-wave plate 102 switches should be equal to one-half of the actual angle $\phi$ through which the principal axis of each of the spatial light modulators 12 independently switch, i.e., $\theta = \phi/2$. Nominally, the principal axis of each of the spatial light modulators switches through an angle of 45°, which rotates the direction of polarization of the light reflected towards the beam splitter 119 by 90°. In this case, the value of $\theta$ should be 22.5°, or any odd integral multiple of 22.5°. However, if the principal axis of each of the spatial light modulators actually switch through 44°, for example, which rotates the direction of polarization of the light reflected towards the beam splitter by 88°, the value of $\theta$ should be 22.0°.

A difference between the angle $\theta$ through which the principal axis of the switchable half-wave plate 102 switches and one-half of the actual angle $\phi$ through which the principal axis of each of the spatial light modulators 12 switch reduces the contrast of the light valve 100. The contrast of the light valve is the ratio between the light output by the light valve with its pixels in their 1 state and that output by the light valve with its pixels in their 0 state. The reduction in contrast is mainly due to an increase in the light output by the light valve with its pixels in their 0 state. The maximum allowable difference between $\theta$ and $\phi/2$ depends on the contrast required of the light valve, with a small difference being required for high contrast. For example, a difference between $\theta$ and $\phi/2$ of less than about ±3.5° is required to provide a contrast of 20 dB (10:1), and a difference of less than about ±1.5° is required to provide a contrast of 40 dB (100:1).

FIGS. 5A, 5B and 5C show the switchable half-wave plate 102 operating in response to a control signal generated by the control circuit 104. The control circuit generates the control signal with two states corresponding to the two states of the switchable half-wave plate. During the illumination period of each display period, the control signal is in a state that sets the switchable half-wave plate to its 0 state. In the 0 state of the switchable half-wave plate, the direction of the principal axis of the switchable half-wave plate is parallel to the direction of polarization of the light reflected by the beam splitter 119. During the balance period of each display period, the control signal is in a state that sets the switchable half-wave plate to its 1 state. In the 1 state of the switchable half-wave plate, the direction of the principal axis of the switchable half-wave plate is at the angle $\theta$ relative to the direction of the principal axis in the 0 state.

The control circuit 104 is additionally shown as generating a second control signal that controls the polarized light source 115 to modulate the intensity of the light generated by the light source. The intensity of the light is preferably modulated because currently-available embodiments of the switchable half-wave plate 102 do not switch instantaneously between their respective 0 and 1 states. Illuminating the light valve 100 during the time that the switchable half-wave plate changes state reduces the contrast performance of the light valve. To prevent this problem, the light source is modulated so that it is switched OFF, or its intensity is substantially reduced, each time the state of the switchable half-wave plate is changed. The OFF time corresponds to the time required for the state of the switchable half-wave plate to change.

The control circuit 104 is shown as generating the control signals in response to the input video signal 43. The control circuit could alternatively generate the control signals in response to a synchronizing signal generated from the input video signal by one or more of the spatial light modulators 12. As a further alternative, the switchable half-wave plate 102 and the polarized light source 115 can be controlled by control signals generated by one or more of the spatial light modulators. In this case, a separate control circuit would not be required. Circuit arrangements that can generate suitable control signals for controlling the switchable half-wave plate and the polarized light source in response to an input video signal or other synchronizing signal are known in the art and will not be described here.

Figure 7:
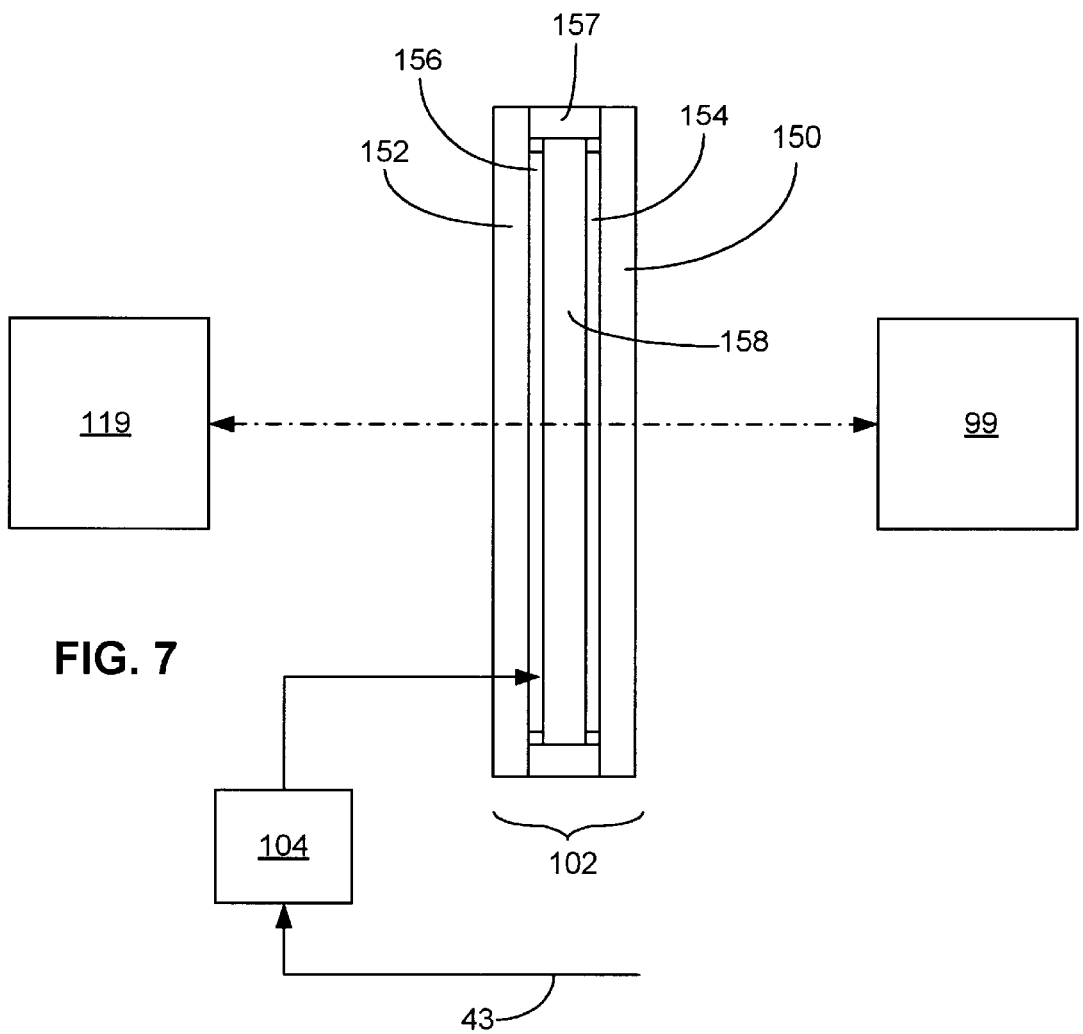
FIG. 7 is a schematic view of an electrically-operated switchable half-wave plate.

One practical embodiment of the light valve 100 incorporates a switchable half-wave plate 102 based on a ferro-electric liquid crystal which is depicted in FIG. 7 and will be described in more detail below. In this embodiment, the OFF time of the polarized light source 115 was 0.1 ms, and the illumination period and the balance period were each 3.3 ms. Thus, in this embodiment, modulating the light source as just described reduces the light throughput by only a few percent.

In display devices in which simplicity is of paramount importance, and reduced contrast is acceptable, the polarized light source 115 can remain ON continuously. Reduced contrast is acceptable, for example, in displays that operate in high ambient light levels. Moreover, it may be possible for the light source to remain ON continuously if the switching times of the switchable half-wave plate and the spatial light modulator are short compared with the illumination and balance periods.

FIGS. 5D–5O illustrate the operation the light valve 100 shown in FIG. 5A utilizing first, second, and third exemplary pixels controlled by the first, second, and third pixel electrodes 61, 62 and 63, one in each of the three spatial light modulators 12 during three exemplary frames of the input video signal 43. Each of the three exemplary pixel electrodes 61, 62 and 63 is functionally similar to the exemplary pixel electrode 38 depicted in FIG. 1A and previously described. The remaining pixel electrodes in each of the spatial light modulators operate similarly. Each of the display periods corresponds to one frame of the input video signal and is composed of an illumination period (ILLUM) and a balance period (BALANCE) having equal durations, as shown in FIG. 5D.

FIGS. 5E, 5F, and 5G show the independent drive signals applied to the first, second, and third pixel electrode 61, 62, and 63, respectively. Each of the three independent drive signals is functionally similar that described above with reference to FIG. 1C and will not be described again here, except to note that, during the balance period, the level of each drive signal is 0 and V for times equal to the times that it was at V and 0, respectively, during the illumination period, so that the electric field applied to the liquid crystal material of each pixel averages to zero over the display period.

FIG. 5H shows the state of the switchable half-wave plate 102. In the 0 state, the direction of the principal axis of the switchable half-wave plate is aligned parallel to the direction of polarization of the incident light generated by the polarized light source 115. This corresponds to the direction of maximum reflectivity of the beam splitter 119. As a result, the direction of polarization of the light generated by the light source remains unchanged after passing though the switchable half-wave plate in its 0 state. Thus, when the light that has passed through the switchable half-wave plate in its 0 state impinges on each of the spatial light modulators 12, its direction of polarization is parallel to the principal axis of any of the spatial light modulators that are in the 0 state, and is at an angle of φ=2θ to the principal axis of any of the spatial light modulators that are in the 1 state.

In the 1 state of the switchable half-wave plate 102, the direction of the principal axis is at the non-zero angle θ to the direction of polarization of the incident light. The value of θ is discussed above. As a result, the direction of polarization of the light from the polarized light source 115 is rotated through an angle of 2θ by passing though the switchable half-wave plate in this state. Thus, when the light that has passed through the switchable half-wave plate in its 1 state impinges on each of the spatial light modulators 12, its direction of polarization is at an angle of φ=2θ to the principal axis of any of the spatial light modulators that are in the 0 state, and is parallel to the principal axis of any of the spatial light modulators that are in the 1 state.

FIG. 5I shows the combined effect of first pixel electrode 61 and the switchable half-wave plate 102 on the direction of polarization of the light impinging on the beam splitter 119 after reflecting from the first pixel electrode 61 and passing through the switchable half-wave plate 102 a second time. The direction of polarization is indicated by the absolute value of the angle α between direction of polarization of the light impinging on the beam splitter and the direction of maximum transmissivity of the beam splitter. The beam splitter transmits light having an angle α close to zero and reflects light having an angle α close to 90°. In this Figure, the polarized light source 115 is unmodulated to show the timing of the changes in the direction of polarization of the light impinging on the beam splitter. Similarly, FIGS. 5J and 5K show for the second pixel electrode 62 and the third pixel electrode 63, respectively, the combined effect of that pixel electrode and the switchable half-wave plate 102 on the direction of polarization of the light impinging on the beam splitter 119 after reflecting from that pixel electrode and passing through the switchable half-wave plate 102 a second time.

In contrast to FIG. 1D, the direction of polarization of the light impinging on the beam splitter 119 in each of FIGS. 5I, 5J, and 5K is the same during the first temporal portions 1 TP of both the illumination period and the balance period and is the same during the second temporal portions 2 TP of both the illumination period and the balance period. Consequently, switching the switchable half-wave plate to its 0 state during the illumination period and to its 1 state during the balance period of each display period inverts the sense of the light valve 100 relative to the direction of the electric field applied to the liquid crystal material of each of the spatial light modulators 12. This causes the light valve to operate in the same sense during both the illumination and balance periods of the display period. Consequently, the light valve can be illuminated during both the illumination and balance periods of each display period, and a display device incorporating the light valve generates a positive image in both the illumination and balance periods of the display period.

FIG. 5L shows the modulation of the light generated by the polarized light source 115. The light source is ON throughout most the illumination period and most of the balance period of each display period, and is OFF only during the brief periods during which the switchable half-wave plate 102 is changing state.

FIGS. 5M, 5N and 5O show the light output from the light valve 100 after having been reflected by the first, second, and third pixel electrode 61, 62 and 63, respectively. In these Figures, the polarized light source 115 is modulated as shown in FIG. 5L. The durations of the temporal portions of both the illumination period and the balance period of each display period during which light is output are the same. Since the polarized light source 115 is modulated as shown in FIG. 5L, the light valve is not illuminated during the switching transients of the switchable half-wave plate 102.

FIGS. 6A–6E illustrate the actions of the switchable half-wave plate 102 and the spatial light modulators 12 on the direction of polarization of light passing through the light valve 100 at four different points along the optical path of the light valve and in the four possible combinations of the 0 and 1 states of the switchable half-wave plate and each of the spatial light modulators. The points along the optical path are marked A–D in the schematic view of the light valve shown in FIG. 6A. The points are the point A, where the polarized light received at the light input 106 enters the switchable half-wave plate 102 after reflection by the beam splitter 119; the point B, where the light transmitted through the switchable half-wave plate and directed by the color separator 99 enters one of the spatial light modulators 12; the point C where the light reflected by the particular spatial light modulator enters the switchable half-wave plate; and the point marked D where the light transmitted by the switchable half-wave plate enters the beam splitter 119.

In the example shown, in the 0 states of the switchable half-wave plate 102 and the spatial light modulator 12, the principal axes 110 and 114 of these elements are both aligned parallel to the direction of maximum reflectivity of the beam splitter 119, which corresponds to the direction of polarization of the light received at the light input (the first direction). Moreover, the principal axis 110 of the switchable half-wave plate rotates through an angle of 22.5° and the principal axis 114 of the spatial light modulator rotates through an angle of 45° between the 0 state and the 1 state of these elements.

FIG. 6B shows the actions of the switchable half-wave plate 102 and one of the spatial light modulators 12 when both are in their 0 states. In this state, the principal axes 110 and 114 of the switchable half-wave plate 102 and the spatial light modulator 12, respectively, are both parallel to the direction of maximum reflectivity of the beam splitter 119. Consequently, the direction of polarization 112 of the light received at the light input 106 and reflected by the beam splitter is parallel to the principal axis 110 of the switchable half-wave plate in its 0 state, as shown at A. The switchable half-wave plate therefore transmits the light received at the light input without changing the direction of polarization of this light.

The direction of polarization 116 of the light transmitted by the switchable half-wave plate 102 is parallel to the principal axis 114 of the spatial light modulator 12 in its 0 state, as shown at B. The spatial light modulator therefore reflects the light transmitted by the switchable half-wave plate without changing the direction of polarization of this light.

The direction of polarization 118 of the light reflected by the spatial light modulator 12 is parallel to the principal axis 110 of the switchable half-wave plate 102 in its 0 state, as shown at C. The switchable half-wave plate therefore transmits the light reflected by the spatial light modulator without changing the direction of polarization of this light.

The direction of polarization 120 of the light transmitted by the switchable half-wave plate 102 is orthogonal to the direction of maximum transmissivity 122 of the beam splitter 119, as shown at D. The beam splitter reflects the light transmitted by the switchable half-wave plate away from the light output 108, so that the pixel appears dark when viewed from the light output.

FIG. 6C shows the actions of the switchable half-wave plate 102 and one of the spatial light modulators 12 when the switchable half-wave plate is in its 0 state and the spatial light modulator is in its 1 state. In this state, the principal axis 110 of the switchable half-wave plate 102 is parallel to, and the principal axis of the spatial light modulator 12 is at an angle of $\phi=45°$ to the direction of maximum reflectivity of the beam splitter 119. Consequently, the direction of polarization 112 of the light received at the light input 106 and reflected by the beam splitter is parallel to the principal axis 110 of the switchable half-wave plate in its 0 state, as shown at A. The switchable half-wave plate therefore transmits the light received at the light input without changing the direction of polarization of this light.

The direction of polarization 116 of the light transmitted by the switchable half-wave plate 102 is at an angle of 45° to the principal axis 114 of the spatial light modulator 12 in its 1 state, as shown at B. The spatial light modulator therefore rotates the direction of polarization of the light transmitted by the switchable half-wave plate through 90° when it reflects this light. The direction of polarization of the light at B after reflection is indicated at 124.

The direction of polarization 118 of the light reflected by the spatial light modulator 12 is at an angle of 90° to the principal axis 110 of the switchable half-wave plate 102 in its 0 state, as shown at C. The switchable half-wave plate therefore leaves the direction of polarization of the light reflected by the spatial light modulator unchanged when it transmits this light.

The direction of polarization 120 of the light transmitted by the switchable half-wave plate 102 is parallel to the direction of maximum transmissivity 122 of the beam splitter 119, as shown at D. The beam splitter therefore transmits the light transmitted by the switchable half-wave plate to the light output 108, and the pixel appears bright when viewed from the light output.

FIG. 6D shows the actions of the switchable half-wave plate 102 and one of the spatial light modulators 12 when the switchable half-wave plate is in its 1 state and the spatial light modulator is in its 0 state. In this state, the principal axis 110 of the switchable half-wave plate 102 is at an angle of $\theta=22.5°$ to, and the principal axis of the spatial light modulator 12 is parallel to, the direction of maximum reflectivity of the beam splitter 119. Consequently, the direction of polarization 112 of the light received at the light input 106 and reflected by the beam splitter is at an angle of 22.5° to the principal axis 110 of the switchable half-wave plate in its 1 state, as shown at A. The switchable half-wave plate therefore rotates the direction of polarization of the light received at the light input through 45° when it transmits this light.

The direction of polarization 116 of the light transmitted by the switchable half-wave plate 102 is aligned at an angle of 45° to the principal axis 114 of the spatial light modulator 12 in its 0 state, as shown at B. The spatial light modulator therefore rotates the direction of polarization of the light transmitted by the switchable half-wave plate through 90° when it reflects this light. The direction of polarization of the light at B after reflection is indicated at 124.

The direction of polarization 118 of the light reflected by the spatial light modulator 12 is at an angle of 67.5° to the principal axis 110 of the switchable half-wave plate 102 in its 1 state, as shown at C. The direction of polarization shown at 118 is the mirror image of the direction of polarization shown at 124 because the view in C is in the opposite direction to the view in B. The switchable half-wave plate therefore rotates the direction of polarization of the light reflected by the spatial light modulator though 135° when it transmits this light.

The direction of polarization 120 of the light transmitted by the switchable half-wave plate 102 is parallel to the direction of maximum transmissivity 122 of the beam splitter 119, as shown at D. The beam splitter therefore transmits the light transmitted by the switchable half-wave plate to the light output 108, and the pixel appears bright when viewed from the light output.

FIG. 6E shows the actions of the switchable half-wave plate 102 and one of the spatial light modulators 12 when both are in their 1 states. In this state, the principal axis of the switchable half-wave plate 102 is at an angle of θ=22.5° to, and the principal axis of the spatial light modulator 12 is at an angle of φ=45° to the direction of maximum reflectivity of the beam splitter 119. Consequently, the direction of polarization 112 of the light received at the light input 106 and reflected by the beam splitter 119 is at an angle of 22.5° to the principal axis 110 of the switchable half-wave plate in its 1 state, as shown at A. The switchable half-wave plate therefore rotates the direction of polarization of the light received at the light input through 45° when it transmits this light.

The direction of polarization 116 of the light transmitted by the switchable half-wave plate 102 is parallel to the principal axis 114 of the spatial light modulator 12 in its 1 state, as shown at B. The spatial light modulator therefore reflects the light transmitted by the switchable half-wave plate without changing the direction of polarization of this light. The direction of polarization of the light at B after reflection is indicated at 124, which coincides in direction with 116.

The direction of polarization 118 of the light reflected by the spatial light modulator 12 is at an angle of 22.5° to the principal axis 110 of the switchable half-wave plate 102 in its 1 state, as shown at C. The direction of polarization shown at 118 is the mirror image of the direction of polarization shown at 124 because the view in C is in the opposite direction to the view in B. The switchable half-wave plate therefore rotates the direction of polarization of the light reflected by the spatial light modulator though 45° when it transmits this light.

The direction of polarization 120 of the light transmitted by the switchable half-wave plate 102 is orthogonal to the direction of maximum transmissivity 122 of the beam splitter 119, as shown at D. The beam splitter therefore reflects the light transmitted by the switchable half-wave plate away from the light output 108, so that the pixel appears dark when viewed from the light output.

It can be seen by comparing FIGS. 6B and 6D that, when a particular spatial light modulator 12 is in its 0 state, the direction of polarization of the light impinging on the beam splitter 119 after reflection from that spatial light modulator is orthogonal to (pixel dark) and parallel to (pixel bright) the direction of maximum transmissivity 122 when the switchable half-wave plate is in its 0 state and in its 1 state, respectively. Similarly, it can be seen by comparing FIGS. 6C and 6E that, when a particular spatial light modulator is in its 1 state, the direction of polarization of the light impinging on the beam splitter after reflection from that spatial light modulator is parallel to (pixel bright) and orthogonal to (pixel dark) the direction of maximum transmissivity when the switchable half-wave plate is in its 0 state and in its 1 state, respectively. The duration of the 1 state of the particular spatial light modulator during the illumination period is the same as the duration of the 0 state during the following balance period. However, changing the state of the switchable half-wave plate between the illumination period and the balance period inverts the sense of the light valve 100 relative to the direction of the electric field applied to the liquid crystal material of the spatial light modulator 12. Consequently, the direction of polarization of the light incident on the beam splitter is at the same angle relative to the direction of maximum transmissivity during the same temporal portion of both the illumination period and the balance period.

FIG. 7 is a schematic view of a switchable half-wave plate 102 that is switched electrically. The color separator 99 and the beam splitter 119 are also depicted in the Figure for reference. In this embodiment, the switchable half-wave plate 102 is based on a layer of a liquid crystal material 158 sandwiched between a first transparent electrode 154 and a second transparent electrode 156. The first transparent electrode is supported by a first transparent cover 150, while the second transparent electrode is supported by a second transparent cover 152. A spacer 157 separates the first transparent cover 150 from the second transparent cover 152.

The control circuit 104 generates a control signal that has two voltage states 0 and $V_2$. In response to the video input signal 43, the control circuit generates the control signal in its 0 state during the illumination period and in its $V_2$ state during the balance period of each display period. The control signal generated by the control circuit is connected to the second transparent electrode 156. The first transparent electrode 154 is connected to a constant voltage source (not shown) generating a voltage of $V_2/2$.

The liquid crystal layer 158 may be a layer of a surface-stabilized ferroelectric liquid crystal (SSFLC) material oriented with its principal axis parallel to the direction of maximum reflectivity of the beam splitter 119. For example, the SSFLC material may be a Smectic C* ferroelectric liquid crystal material having an angle of 11.25° between its director and the normal to its smectic layers. Reversing the direction of the electric field applied to this liquid crystal material switches the director of the material through 22.5°. A Smectic C* ferroelectric liquid crystal material having an angle of 11.25° between its director and the normal to its smectic layers is not commonly available, but can be custom manufactured by suppliers of liquid crystal materials. Alternatively, a commonly-available Smectic C* ferroelectric liquid crystal material having an angle of 22.50° between its director and the normal to its smectic layers at temperatures within a normal operating temperature range can be given an angle of 11.25° between its director and the normal to its smectic layers by operating the liquid crystal material at the appropriate temperature outside its normal operating temperature range.

The thickness of the liquid crystal layer 158 is defined by the spacing between the first transparent electrode 154 and the second transparent electrode 156. This spacing is set to a distance equal to $\lambda/(2\Delta n)$, where $\lambda$ is a wavelength in the middle of the visible range (550 nm in this example), and $\Delta n$ is the difference between the fast and slow refractive indices of the SSFLC material. A layer of this thickness generates a phase shift of 90° at the design wavelength $\lambda$, and phase shifts close to 90° at other wavelengths.

Alternatively, the SSFLC material of the liquid crystal layer 158 may be a Smectic A*-type liquid crystal material.

With this material as the liquid crystal layer, and the transparent electrode 154 is connected to ground (zero V). The angle through which the principal axis of such materials rotates in response to an electric field depends on the voltage applied between the electrodes 156 and 154. This enables the value of θ, the angle of rotation of the principal axis of the switchable half-wave plate 102, to be set to exactly one-half of the actual angle of rotation φ of the principal axis of each of the spatial light modulators 12. This can be done by making an appropriate choice of the voltage V applied to the transparent electrode 156 in the 1 state of the switchable half-wave plate.

In addition, it is preferable to coat at least the first and second transparent cover plates 150, 152 with a layer of an anti-reflective material to prevent multiple reflections between adjacent cover plates.

Figure 8:
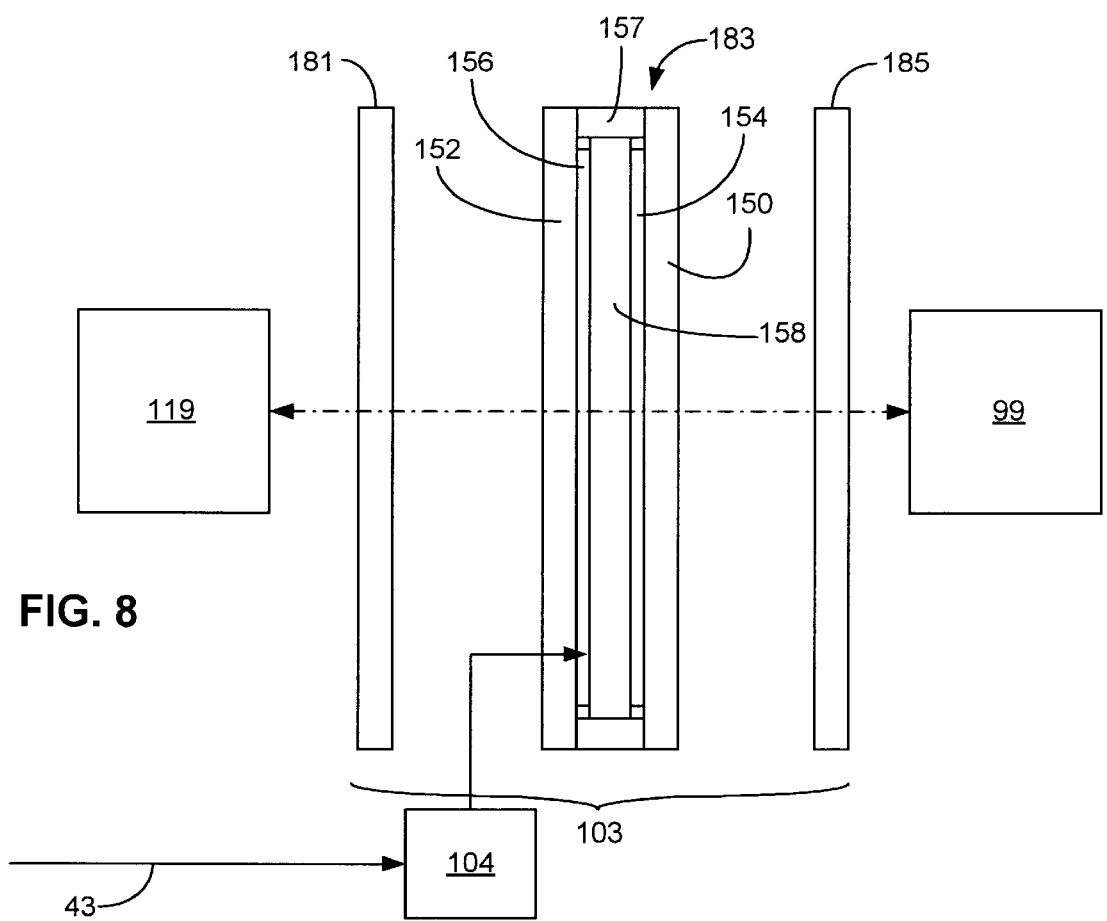
FIG. 8 is a schematic view of an electrically-operated achromatic switchable half-wave plate.

Another type of electrically switchable half-wave plate that can be used in the light valve 100 according to the invention is the achromatic switchable half-wave plate 103 depicted in FIG. 8. The achromatic switchable half-wave plate inverts the sense of the light valve relative to the direction of the electric field applied to the liquid crystal material of the spatial light modulators 12. A suitable achromatic switchable half-wave plate is described by Sharp et al. in U.S. Pat. No. 5,658,490, the entire disclosure of which is incorporated into this disclosure by reference. Alternatively, other types of achromatic switchable half-wave plate may be used as the achromatic switchable half-wave plate instead of the example shown.

In the example shown in FIG. 8, the achromatic switchable half-wave plate 103 is composed of a first fixed quarter-wave plate 181, the switched half-wave plate 183 and a second fixed quarter-wave plate 185 arranged in series along the optical path between the beam splitter 119 and the color separator 99.

The first and second fixed quarter-wave plates 181 and 185 can be made from any suitable birefringent material such as quartz, mica, stretched films of such polymers as polyesters or polycarbonates, polymer liquid crystal films, or other suitable materials. The fixed quarter-wave plates should each have a thickness that provides a phase shift of 90° at the above-described design wavelength. The structure of the switched half-wave plate 183 is similar to that of the switchable half-wave plate 102 described above with reference to FIG. 7. Elements of the embodiment shown in FIG. 8 that correspond to elements of the embodiments shown in FIG. 7 are indicated using the same reference numerals and will not be described again here.

FIG. 8 shows the first and second fixed quarter-wave plates 181, 185 and the switched half-wave plate 183 as separate elements. However, in a practical embodiment, the elements are attached to one-another with an index-matching cement to provide structural integrity and to reduce optical losses.

Figure 9:
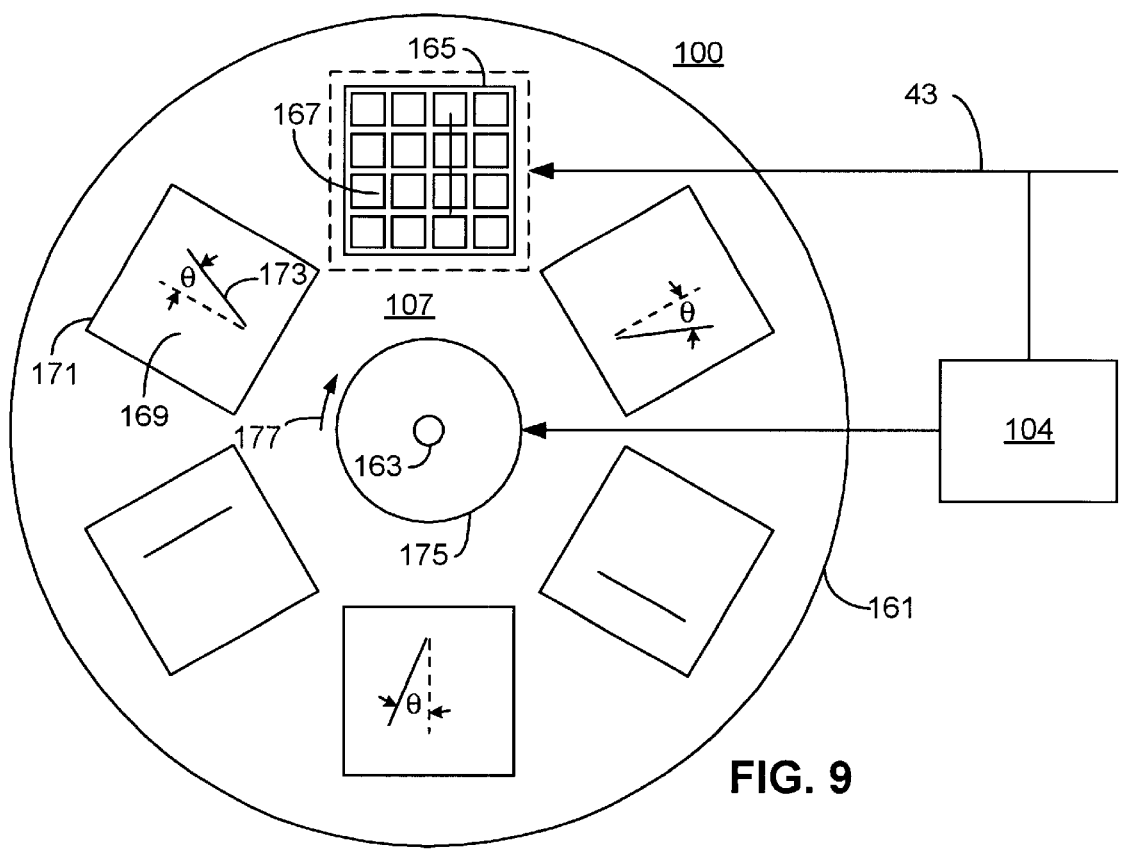
FIG. 9 is a front view of part of an embodiment of a high throughput color light valve according to the invention having a mechanically-operated switchable half-wave plate.

Finally, a mechanically switched half-wave plate 107 may be substituted for the electrically switched half-wave plate 102 in the light valve 100 according to the invention. For example, FIG. 9 shows part of an embodiment of the light valve 100 according to the invention that includes an example of a mechanically-operated switchable half-wave plate 107. The wheel 161 is rotatably mounted on a pivot 163 between the beam splitter 119 (not shown this Figure) and the color separator 99 (not shown this Figure). Formed at regular angular intervals in the wheel 161 are windows having dimensions slightly larger than the active area of the spatial light modulator. An exemplary window is shown at 165. The wheel is positioned so that the windows sequentially become aligned with the optical path between the beam splitter 119 and the color separator 99. Thus, light traveling to and reflected from the active area 167 of each of the spatial light modulators 12 passes through sequential windows as the wheel rotates.

Conventional half-wave plates are mounted in each of the windows. The exemplary half-wave plate 169 is shown mounted in the window 171. Each alternate half-wave plate is oriented so that, when the window in which the half-wave plate is mounted is aligned with the with the optical path between the beam splitter 119 and the color separator 99, the principal axis 173 of the half-wave plate is at the angle θ to the direction of polarization of the light received at the light input 106 (not shown this Figure), and is also at the angle θ to the direction of maximum reflectivity of the beam splitter 119. Each remaining half-wave plate is oriented so that, when the window in which the half-wave plate is mounted is aligned with the optical path between the beam splitter and the color separator, the principal axis of the half-wave plate is parallel to the direction of polarization of the light received at the light input 106 and to the direction of maximum reflectivity of the beam splitter. The half-wave plates whose principal axes are parallel to the direction of polarization of the light generated by the polarized light source may be omitted.

The wheel 161 is rotationally stepped by the stepper motor 175 in response to a control signal generated by the controller 104. Control circuits capable of deriving a suitable control signal from the input video signal 43, or from a synchronizing signal are known in the art and will therefore not be described here. The motor rotates the wheel in steps and is stationary throughout the times the polarized light source (not shown) illuminates the light valve. FIG. 9 shows the position of the wheel during the illumination period of an arbitrary display period. In this position, the active area 167 of each of the spatial light modulators 12 is exposed (after separation and distribution of the colorbands by the color separator) to light transmitted by the half-wave plate mounted in the window 165. Since the principal axis of the half-wave plate mounted in the window 165 is parallel to the directions of polarization of the light received at the light input 106 and the light reflected by each of the spatial light modulators, the mechanically switchable half-wave plate 107 in the position shown does not change the direction of polarization light transmitted through it to each of the spatial light modulators 12.

During the period of no illumination between the illumination period and the subsequent balance period, the stepper motor 175 steps the wheel 161 through 60° in the direction of the arrow 177 so that the active area 167 of each of the spatial light modulators 12 is exposed (after separation and distribution of the colorbands by the color separator) through the window 171 during the balance period. The half-wave plate 169 mounted in the window 171 causes the mechanically switchable half-wave plate 107 to rotate the direction of polarization of light passing through it to each of the spatial light modulators 12 and after reflection by each of the spatial light modulators (after passing through the color separator). As a result, the mechanically switchable half-wave plate 107 inverts the sense of the light valve 100 relative to the direction of the electric field applied to the liquid crystal material of each of the spatial light modulators 12, as described above.

Alternatively, only the windows 165 and 171 may be formed in the wheel 161 or some other suitably-shaped movable structure. Half-wave plates are mounted in the windows, one with its principal axis parallel to the direction of polarization of the light generated by the light source, and one with its principal axis at an angle of θ to the direction of polarization of the light generated by the light source. In this case, the motor 175 steps the wheel in the direction indicated by the arrow 177 between the illumination period and balance period of a given display period, and then steps the wheel in the opposite direction between the balance period of the display period and the illumination period of the next display period. The half-wave plate with its principal axis parallel to the direction of polarization of the light generated by the polarized light source may optionally be omitted, as described above.

The invention has been described with reference to an example in which the directions of polarization of the polarizer and analyzer are orthogonal to one another. However, this is not critical to the invention; the sense of the spatial light modulator may be reversed, and the directions of polarization of the polarizer and the analyzer may be parallel to one another. However, this requires that the beam splitter be a non-polarizing beam splitter.

The invention has been described with reference to examples in which the beam splitter reflects the light generated by the polarizing light source and transmits the light reflected by the reflective spatial light modulator. However, this is not critical to the invention; the positions of the light input and the light output can be interchanged, the positions of the polarized light source and the output optics can be interchanged, and the beam splitter can transmit the light generated by the polarizing light source and can reflect the light reflected by the reflective spatial light modulator. In this case, references in this disclosure to the direction of maximum reflectivity of the beam splitter become references to the direction of maximum transmissivity and references to the direction of maximum transmissivity of the beam splitter become references to the direction of maximum reflectivity.

The invention has been described with reference to examples in which the pixels of the light valve are bright during the first temporal portions of the illumination period and of the balance period, and are dark during the second temporal portions of the illumination period and the balance period. However, this is not critical to the invention; the pixels of the light valve may be bright during the second temporal portions, in which case they are dark during the first temporal portions. As a further alternative, if the first temporal portion precedes the second temporal portion of the illumination period, the first temporal portion may follow the second temporal portion of the balance period.

Although this disclosure describes illustrative embodiments of the invention in detail, it is to be understood that the invention is not limited to the precise embodiments described, and that various modifications may be practiced within the scope of the invention defined by the appended claims.

We claim:

1. A color light valve, comprising:
   a light input through which is received light having a direction of polarization parallel to a first direction;
   reflective ferroelectric liquid crystal-based spatial light modulators, each structured as a quarter-wave plate and each having a principal axis independently switchable through an angle of rotation substantially equal to φ;
   a light output through which the light received at the light input is output after reflection by at least one of the spatial light modulators;
   a color separator configured to:
      separate the light received at the light input into colorbands, and
      distribute the colorbands to the spatial light modulators;
   a beam splitter located and aligned relative to the light input, the light output, the color separator, and the spatial light modulators to:
      one of a) reflect and b) transmit a portion of the light received at the light input towards the color separator, and
      the other of a) transmit and b) reflect towards the light output a portion of the light reflected by the spatial light modulators; and
   a switchable half-wave plate located between the beam splitter and the color separator, the switchable half-wave plate being structured as a half-wave plate and having a principal axis switchable through an angle of rotation θ substantially equal to φ/2.

2. The light valve of claim 1, in which:
   the spatial light modulators include a first, a second, and a third spatial light modulator.

3. The light valve of claim 1, in which the beam splitter includes a polarizing beam splitter having orthogonal directions of maximum transmissivity and maximum reflectivity, one of the directions being parallel to the first direction.

4. The light valve of claim 2, in which:
   the switchable half-wave plate has a 0 state, in which the principal axis of the switchable half-wave plate is substantially parallel to the first direction, and a 1 state, in which the principal axis of the switchable half-wave plate is at the angle θ to the first direction; and
   each of the first, the second, and the third spatial light modulator independently has a 0 state, in which the principal axis thereof is substantially parallel to the first direction, and a 1 state, in which the principal axis thereof is substantially at the angle φ to the first direction.

5. The light valve of claim 4, in which the switchable half-wave plate includes:
   a pair of opposed transparent electrodes; and
   a layer of liquid crystal material sandwiched between the electrodes.

6. The light valve of claim 5, in which:
   the liquid crystal material is a ferroelectric liquid crystal material; and
   the light valve additionally comprises a control circuit that generates a control signal having a 0 state and a 1 state corresponding to the 0 state and the 1 state of the switchable half-wave plate, the control signal being connected to the electrodes to generate an electric field between the electrodes, the electric field reversing in direction between the 1 state and the 0 state of the control signal.

7. The light valve of claim 5, in which:
   the liquid crystal material is a nematic liquid crystal material; and
   the light valve additionally comprises a control circuit that generates a control signal having a 0 state and a 1 state corresponding to the 0 state and the 1 state of the switchable half-wave plate, the control signal being connected to the electrodes to generate an electric field between the electrodes, the electric field having a different field strength between the 1 state and the 0 state of the control signal.

8. The light valve of claim 4, in which:
the switchable half-wave plate includes a plate of electro-optical material; and
the light valve additionally comprises a control circuit that generates a control signal having a 0 state and a 1 state corresponding to the 0 state and the 1 state of the switchable half-wave plate, the control signal being connected to the electro-optical material to change a birefringent property of the electro-optical material in one of the states of the switchable half-wave plate.

9. The light valve of claim 1, in which the switchable half-wave plate includes:
a first half-wave plate having a principal axis aligned substantially parallel to the first direction;
a second half-wave plate having a principal axis aligned at the angle θ to the first direction; and
mechanical means for alternately locating the first half-wave plate and the second half-wave plate between the color separator and the polarizing beam splitter.

10. The light valve of claim 4, in which:
the light valve additionally comprises a control system that generates a switching control signal and a first, a second, and a third control signal,
the switching control signal is connected to the switchable half-wave plate and having a 0 state and a 1 state corresponding to the 0 state and the 1 state of the switchable half-wave plate, and having a first period, during which the switching control signal is in one of the 0 state and the 1 state, and a second period equal in duration to the first period, during which the switching control signal is in the other of the 0 state and the 1 state,
the first, the second, and the third control signal are connected to the first, the second, and the third spatial light modulator, respectively, and each of the first, the second, and the third control signal independently has a 0 state and a 1 state defining the 0 state and the 1 state of the first, the second, and the third spatial light modulator, respectively, and
each of the first, second, and third control signal is independently in one of the 0 state and the 1 state for a portion of the first period, in the other of the 0 state and the 1 state for a remainder of the first period and for a portion of the second period equal in duration to the portion of the first period, and in the one of the 0 state and the 1 state for a remainder of the second period.

11. The light valve of claim 1, in which:
the color separator includes a first, a second and a third dichroic plate, each independently configured to reflect one of a first, a second and a third colorband towards one of the first, second and third spatial light modulator.

12. The light valve of claim 1, in which:
the color separator includes an color separation cube.

13. The light valve of claim 1, in which:
the color separator includes a three-prism color separator.

14. A method of increasing light throughput of a multi-color component reflective light valve that requires DC balancing, the method comprising:
providing a reflective light valve including a first, a second, and a third reflective spatial light modulator, a color separator, and a polarizing beam splitter, the polarizing beam splitter having orthogonal directions of maximum transmissivity and maximum reflectivity, one of the directions defining a direction of polarization of light incident on the color separator, the other of the directions defining a direction of polarization of light output from the light valve, each of the first, the second and the third spatial light modulator having a principal axis independently switchable between a first direction and a second direction, the second direction being substantially at an angle φ to the first direction;
providing a switchable half-wave plate having a principal axis switchable between a third direction and a fourth direction, the fourth direction being at an angle θ to the third direction;
inserting the switchable half-wave plate into the light valve between the polarizing beam splitter and the color separator and with the third direction aligned parallel to the first direction;
operating each of the first, the second and the third spatial light modulator in a first time period and a second time period equal to the first time period with the principal axis thereof independently being in the first direction for a portion of the first time period and the principal axis thereof independently being in the second direction for a portion of the second time period equal in duration to the portion of the first time period;
operating the switchable half-wave plate with the principal axis thereof in the third direction through the first period and in the fourth direction through the second period, and with the angle θ substantially equal to φ/2.

15. The method of claim 14, in which, in providing the switchable half-wave plate, there is provided a switchable half-wave plate including:
a pair of opposed transparent electrodes; and
a layer of liquid crystal material sandwiched between the electrodes.

16. The method of claim 15, in which:
the liquid crystal material is a ferroelectric liquid crystal material; and
operating the switchable half-wave plate includes:
applying an electric field between the electrodes in a forward direction through the first period, and
applying the electric field between the electrodes in a reverse direction though the second period.

17. The method of claim 15, in which:
the liquid crystal material is a nematic liquid crystal material; and
operating the switchable half-wave plate includes:
applying an electric field between the electrodes through only one of the first period and the second period.

18. The method of claim 14, in which:
in providing the switchable half-wave plate, there is provided a switchable half-wave plate including:
a first fixed half-wave plate having a principal axis in the third direction, and
a second fixed half-wave plate having a principal axis in the fourth direction; and
operating the switchable half-wave plate includes alternately inserting the fixed half-wave plate and the second half-wave plate between the polarizing beam splitter and the color separator.

19. The method of claim 14, in which, in providing the switchable half-wave plate, an achromatic switchable half-wave plate is provided.

20. The method of claim 14, in which:
   in providing the switchable half-wave plate, a switchable half-wave plate is provided in which the principal axis switches between the third direction and the fourth direction in a switching time; and
   the method additionally comprises:
      illuminating the light valve with light having an intensity; and
      reducing the intensity of the light during the switching time of the switchable half-wave plate.

21. The method of claim 12, in which, in providing the color separator, there is provided a first, a second and a third dichroic plate, each independently configured to reflect one of a first, a second and a third colorband towards one of the first, the second and the third spatial light modulator.

22. The method of claim 12, in which, in providing the color separator, there is provided an color separation cube.

23. The method of claim 12, in which, in providing the color separator, there is provided a three-prism color separator.

* * * * *